(12) United States Patent
Passerini et al.

(10) Patent No.: US 10,786,882 B2
(45) Date of Patent: Sep. 29, 2020

(54) MACHINE TOOL, IN PARTICULAR MULTI-SPINDLE TURNING MACHINE

(71) Applicant: GILDEMEISTER ITALIANA S.P.A., Brembate di Sopra (IT)

(72) Inventors: Mirko Passerini, Gaggiano (IT); Paolo Vanotti, Alme (IT); Valter Ginami, Bergamo (IT); Franco Rigolone, Ponteranica (IT)

(73) Assignee: GILDEMEISTER ITALIANA S.P.A., Brembate di Sopra (IT)

( * ) Notice: Subject to any disclaimer, the term of this patent is extended or adjusted under 35 U.S.C. 154(b) by 0 days.

(21) Appl. No.: 16/014,931

(22) Filed: Jun. 21, 2018

(65) Prior Publication Data
US 2018/0369979 A1 Dec. 27, 2018

(30) Foreign Application Priority Data
Jun. 21, 2017 (EP) .................................. 17177209

(51) Int. Cl.
*B23Q 39/04* (2006.01)
*B23Q 16/10* (2006.01)
*B23B 13/04* (2006.01)

(52) U.S. Cl.
CPC ............ *B23Q 39/044* (2013.01); *B23B 13/04* (2013.01); *B23Q 16/102* (2013.01); *B23Q 16/105* (2013.01); *B23Q 2210/004* (2013.01)

(58) Field of Classification Search
CPC ................ B23Q 39/044; B23Q 39/042; B23Q 2039/008; B23Q 2210/004; B23Q 16/107;
(Continued)

(56) References Cited

U.S. PATENT DOCUMENTS 1,743,862 A * 1/1930 Morris ................. B23Q 39/042
29/38 A
2,040,872 A 5/1936 Oberhoffken
(Continued)

FOREIGN PATENT DOCUMENTS

DE 20 2005 015906 U1 2/2007
DE 20 2011 003069 U1 4/2011
(Continued)

OTHER PUBLICATIONS

Description FR2629745 (translation) obtained at https://worldwide.espacenet.com/ (last visited Jan. 30, 2019).*
(Continued)

*Primary Examiner* — Ryan C Rufo
(74) *Attorney, Agent, or Firm* — Oliff PLC

(57) ABSTRACT

The present disclosure relates to a machine tool, in particular multi-spindle turning machine, comprising a machine frame, a turret body being rotatably supported by the machine frame, a plurality of workpiece spindles being arranged on the turret body, each of the workpiece spindles having a workpiece receiving portion for receiving a respective workpiece on one side of the turret body facing a working space of the machine tool, and a torque motor for driving a rotation of the turret body. The torque motor is arranged at a back end portion of the turret body opposite to the side of the turret body facing the working space of the machine tool, and a position locking mechanism for locking a rotational position of the turret body is arranged at a front end portion of the turret body on the side of the turret body facing the working space of the machine tool.

13 Claims, 19 Drawing Sheets

(58) Field of Classification Search
CPC ............. B23Q 16/105; Y10T 279/3487; Y10T 82/2593; Y10T 29/5128; Y10T 29/5129; Y10T 82/2518; Y10T 82/2524; B23B 13/04; B23B 9/08
See application file for complete search history.

(56) References Cited

U.S. PATENT DOCUMENTS

| | | | | |
|---|---|---|---|---|
| 2,055,434 | A | * | 9/1936 | Gridley .................... B23B 9/08 29/38 R |
| 2,096,754 | A | | 10/1937 | Oberhoffken et al. |
| 2,107,543 | A | * | 2/1938 | Miller ..................... B23F 5/166 409/35 |
| 2,429,938 | A | * | 10/1947 | Mansfield ............ B23Q 39/042 29/38 C |
| 2,848,913 | A | | 8/1958 | Thomsen |
| 2,861,322 | A | | 11/1958 | Benes et al. |
| 2,921,364 | A | * | 1/1960 | Petzoldt .................... B23Q 1/70 29/43 |
| 3,078,547 | A | | 2/1963 | Sweet |
| 3,090,283 | A | * | 5/1963 | Chaffee, Jr. .............. B23G 7/00 409/73 |
| 3,121,281 | A | * | 2/1964 | Petro ........................ H01J 9/46 445/71 |
| 3,339,440 | A | * | 9/1967 | Tsuda ...................... B23B 9/005 82/129 |
| 3,371,567 | A | | 3/1968 | Davis |
| 3,508,311 | A | * | 4/1970 | Fink ..................... B23Q 39/042 29/38 R |
| 3,750,498 | A | | 8/1973 | Willen |
| 3,794,436 | A | | 2/1974 | Rowlett |
| 3,798,720 | A | * | 3/1974 | Ledergerber .............. B23B 9/00 29/38 B |
| 3,978,565 | A | * | 9/1976 | Flisch ...................... B23B 9/08 29/38 B |
| 3,981,056 | A | * | 9/1976 | Gilbert ................... B23Q 5/20 29/38 B |
| 4,122,735 | A | | 10/1978 | Evers |
| 4,292,864 | A | | 10/1981 | Cucchi et al. |
| 4,308,771 | A | | 1/1982 | Windle |
| 4,630,979 | A | | 12/1986 | Roux |
| 4,638,693 | A | | 1/1987 | Sugimoto |
| 4,665,781 | A | * | 5/1987 | Eichenhofer ............. B23B 9/08 82/129 |
| 4,771,662 | A | * | 9/1988 | Eichenhofer ............. B23B 9/08 82/129 |
| 4,779,318 | A | * | 10/1988 | Henderson ............... B23Q 5/10 29/38 B |
| 5,016,334 | A | * | 5/1991 | Kovalenko ............. B23Q 5/14 29/38 B |
| 5,044,055 | A | * | 9/1991 | Howarth .................. B23Q 5/36 188/68 |
| 5,076,123 | A | | 12/1991 | McConkey |
| 5,111,562 | A | * | 5/1992 | Burka ................... B23Q 1/5468 29/37 R |
| 5,115,702 | A | | 5/1992 | Link |
| 5,320,010 | A | | 6/1994 | Geiser |
| 5,586,477 | A | | 12/1996 | Babuder et al. |
| 5,730,037 | A | * | 3/1998 | Manning ............. B23Q 39/042 82/118 |
| 5,860,340 | A | | 1/1999 | Cucchi |
| 5,881,617 | A | | 3/1999 | Cucchi |
| 5,896,793 | A | | 4/1999 | Haller et al. |
| 5,924,344 | A | * | 7/1999 | Link ....................... B23B 23/04 82/129 |
| 5,970,830 | A | | 10/1999 | von Niederhausern |
| 6,044,736 | A | * | 4/2000 | Cucchi .................... B23B 13/04 414/14 |
| 6,049,965 | A | | 4/2000 | Perkins, Jr. |
| 6,219,895 | B1 | * | 4/2001 | Muscarella .............. B23Q 5/10 29/38 A |
| 9,724,760 | B2 | | 8/2017 | Kawasumi |
| 2002/0129683 | A1 | * | 9/2002 | Ollis ........................ B23Q 5/10 82/110 |
| 2003/0101854 | A1 | | 6/2003 | Cucchi |
| 2004/0163509 | A1 | | 8/2004 | Zuccalli |
| 2005/0126353 | A1 | | 6/2005 | Trautmann |
| 2006/0196325 | A1 | | 9/2006 | Sakai |
| 2006/0219068 | A1 | | 10/2006 | Uebelhart |
| 2008/0092701 | A1 | | 4/2008 | Yamaguchi et al. |
| 2009/0180856 | A1 | | 7/2009 | Hirosawa et al. |
| 2010/0058903 | A1 | * | 3/2010 | Rigolone .................. B23B 9/08 82/129 |
| 2010/0307301 | A1 | | 12/2010 | Zwara et al. |
| 2011/0048184 | A1 | | 3/2011 | Casalini et al. |
| 2013/0025408 | A1 | | 1/2013 | Vettori |
| 2014/0251096 | A1 | | 9/2014 | Hankey |
| 2015/0266114 | A1 | | 9/2015 | Kopton |
| 2015/0328735 | A1 | * | 11/2015 | Lutz ..................... B23Q 7/1405 29/558 |
| 2016/0158845 | A1 | | 6/2016 | Cucchi |

FOREIGN PATENT DOCUMENTS

| | | | |
|---|---|---|---|
| EP | 0 611 621 A1 | 8/1994 | |
| EP | 0 700 742 A1 | 3/1996 | |
| EP | 0 785 040 A1 | 7/1997 | |
| EP | 1 163 976 A1 | 12/2001 | |
| EP | 1 332 814 A2 | 8/2003 | |
| EP | 1 570 931 A2 | 9/2005 | |
| EP | 2 163 334 A1 | 3/2010 | |
| EP | 2 277 658 A1 | 1/2011 | |
| EP | 2 364 801 A1 | 9/2011 | |
| EP | 2 567 782 A1 | 3/2013 | |
| EP | 2163334 B2 | 8/2016 | |
| FR | 2 049 374 A5 | 3/1971 | |
| FR | 2629745 A1 * | 10/1989 | ............... B23Q 1/28 |
| GB | 1013878 A * | 12/1965 | ........... B23Q 39/042 |
| GB | 2 383 283 A | 6/2003 | |
| JP | S60-114436 A | 6/1985 | |
| WO | 2013/189937 A1 | 12/2013 | |

OTHER PUBLICATIONS

Jul. 11, 2019 Office Action issued in U.S. Appl. No. 16/014,846.
Oct. 24, 2019 U.S. Office Action issued U.S. Appl. No. 16/014,846.
Mar. 20, 2018 Search Report issued in European Patent Application No. 17177210.6.
Mar. 9, 2018 Search Opinion issued in European Patent Application No. 17182775.1.
U.S. Appl. No. 16/014,846, filed Jun. 21, 2018 in the name of Persico et al.
Dec. 19, 2017 Extended European Search Report issued in European Patent Application No. 17177209.8.
U.S. Appl. No. 16/014,772, filed Jun. 21, 2018 in the name of Milesi et al.
Sep. 6, 2019 Office Action issued in U.S. Appl. No. 16/014,772.

* cited by examiner

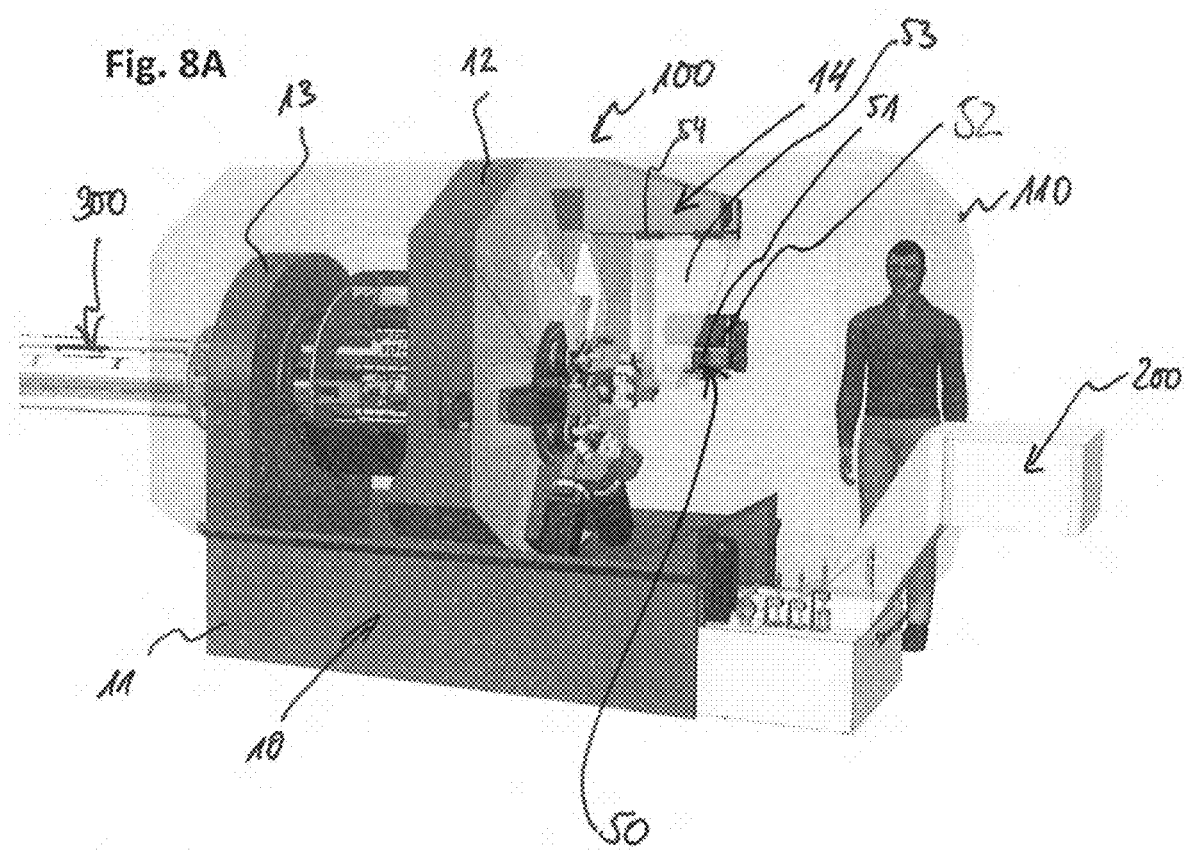

MACHINE TOOL, IN PARTICULAR MULTI-SPINDLE TURNING MACHINE

The present disclosure related to a machine tool, in particular a multi-spindle turninh machine.

BACKGROUND

In the prior art, machine tools, in particular multi-spindle turning machines, are known, including multiple workpiece spindles supported on a rotary drum (turret or turret body), wherein the rotary drum/turret body is configured to rotate/index the rotary drum/turret body around a longitudinal axis thereof.

For example, in EP 2 163 334 B2, a multi-spindle turning machine is described that has multiple workpiece spindles supported on a rotary drum, wherein the rotary drum is configured to rotate/index the rotary drum around a longitudinal axis thereof, and, for each workpiece spindle there is provided a tool assembly holding one or more tools. For relative movement between the workpieces received at the workpiece spindles and the tools of the tool assemblies, the spindles are movable in a Z-direction being axially arranged with the respective spindle axis. Further, each of the tool assemblies is configured to move in a radial X-direction with respect to the longitudinal rotation axis of the drum and in a tangential Y-direction with respect to the longitudinal rotation axis of the drum.

A drive mechanism for indexing a drum/turret of a multi-spindle turning machine using a torque motor is described in US 2013/0025408 A1. However, in US 2013/0025408 A1 the torque motor is arranged in a center portion of a full body turret, so that heat generated by the torque motor is easily dissipated through the turret body and thermal effects may affect the achievable level of accuracy in the machining processes on the turret side facing the workspace. Furthermore, the torque motor is described to not only drive the rotation of the drum/turret, but is further described to be used to lock the drum position during the actual machining of workpieces when the drum is held in a machining position during the machining of workpieces, however, this may actually lead to further increased thermal effects due to heat generated by the torque motor being kept energized during the machining operations.

It is an object of the present disclosure to further develop the concept of the multi-spindle turning machine of EP 2 163 334 B2, taking into account the above, and particularly to enhance the machining options of the multi-spindle turning machine, to provide a compact machine concept, allowing for more flexible, accurate, efficient and reliable machining operations, and/or to improve accuracy and/or stability of the machine tool.

SUMMARY

In view of one or more of the above objects, there is proposed a machine tool, in particular multi-spindle turning machine, according to claim 1. The dependent claims relate to preferred exemplary embodiments.

According to some aspects, there may be provided a machine tool, in particular multi-spindle turning machine, comprising a machine frame, a turret body being rotatably supported by the machine frame, a plurality of workpiece spindles being arranged on the turret body, each of the workpiece spindles having a workpiece receiving portion for receiving a respective workpiece on one side of the turret body facing a working space of the machine tool.

In some exemplary aspects, each of the workpiece spindles may preferably be movable and/or slidable in a longitudinal direction (Z-direction), e.g. in parallel with the longitudinal rotational axis of the turret body and/or in parallel with the respective spindle axis. Accordingly, an advantageously compact design with independent accurate spindle movement in spindle axis direction can be provided.

Furthermore, in some exemplary aspects, there may be provided, for each workpiece spindle, a respective tool post assembly for holding one or more tools. The tool post assembly may preferably be movable in one or more, preferably two directions (X- and/or Y-directions), transversely or perpendicularly to the longitudinal direction. Accordingly, an advantageously compact design with independent accurate tool movement relative to the spindle axis, in particular in one or more directions transversely or perpendicularly to the respective spindle axis, can be provided.

In some preferred aspects, the machine tool may include a torque motor for driving a rotation of the turret body. Accordingly, a compact, efficient, precise and reliable drive mechanism for driving the rotation of the turret body can be provided.

In some preferred aspects, the torque motor may be arranged at a back end portion of the turret body, e.g. opposite to the side of the turret body facing the working space of the machine tool. Advantageously, such exemplary aspect allows to provide the torque motor on an opposite side as the working space area having the tool holder assemblies and other equipment, such that a balanced compact overall design can be provided, and the potential heat generating drive (torque motor) is provided at a distance to the working space area so that heat generation has minimal or almost no influence on equipment and assemblies at the side of the working space area, where high machining precision is required.

In some preferred aspects, a position locking mechanism for locking a rotational position of the turret body may be arranged at a front end portion of the turret body, e.g. on the side of the turret body facing the working space of the machine tool. Accordingly, the position locking mechanism is provided close (adjacent) to the working space area, where high machining precision is required, and therefore the position locking mechanism can lock positions very accurately and precisely to enable optimal exact spindle positioning during the machining operations.

In some preferred aspects, a position detecting mechanism for determining the rotational position of the turret body may be arranged at the front end portion of the turret body on the side of the turret body facing the working space of the machine tool. Accordingly, the position detecting mechanism is provided close (adjacent) to the working space area, where high machining precision is required, and therefore the position locking mechanism can lock positions very accurately and precisely based on the accurate and precise output of the position detecting mechanism to enable optimal exact spindle positioning during the machining operations.

In some preferred aspects, the position detecting mechanism may include an absolute encoder, in particular, wherein the absolute encoder may preferably be arranged around the whole circumference of the front end portion of the turret body. Accordingly, very accurate and precise position detection is provided.

In some preferred aspects, the position locking mechanism may include one or more hydraulic, pneumatic and/or electric brakes.

In some preferred aspects, the position locking mechanism may be arranged around the whole circumference of the front end portion of the turret body, e.g. by arranging brake mechanisms, particularly hydraulic, pneumatic and/or electric brakes, at circumferentially arranged positions.

In some preferred aspects, the machine frame may include a back frame portion rotatably supporting the back end portion of the turret body and/or a front frame portion rotatably supporting the front end portion of the turret body.

In some preferred aspects, a stator of the torque motor may be supported by the back frame portion of the machine frame, and/or a rotor of the torque motor may be arranged on the back end portion of the turret body.

In some preferred aspects, the position locking mechanism and/or a position detecting mechanism may be mounted to the front frame portion of the machine frame.

In some preferred aspects, a space may be provided between the back frame portion and the front end portion.

In some preferred aspects, the turret body has, preferably for each workpiece spindle, a longitudinally extending groove portion for receiving the workpiece spindle, the grooves preferably opening to the space provided between the back frame portion and the front end portion.

In some preferred aspects, the turret body supports, preferably for each workpiece spindle, a slide being guided on longitudinal slides extending longitudinally with respect to the turret body and/or being arranged on an outer side of the turret body adjacent to the respective groove.

In some preferred aspects, the turret body may support, preferably for each workpiece spindle, a drive mechanism for driving a longitudinal linear movement of the respective slide of the respective workpiece spindle.

In some preferred aspects, the drive mechanism may be arranged on a front end portion of the turret body and/or on a back end portion of the turret body, and/or a housing of the drive mechanism may extend radially with respect to the turret body into the space provided between the back frame portion and the front end portion.

In some preferred aspects, the turret body may be rotatably supported by two bearings, one bearing being preferably arranged on the back frame portion of the machine frame and another bearing being preferably arranged on the front frame portion of the machine frame.

In some preferred aspects, a safety brake system may be arranged on the back frame portion of the machine frame, wherein, exemplarily, the safety brake system may be including one or more electrically, pneumatically and/or hydraulically actuated brakes configured to brake a rotational movement of the turret body, wherein in particular the safety brake system may include one or more normally closed brakes being biased into a closing state by a biasing mechanism.

In some preferred aspects, a controller may be provided for controlling a machining of one or more workpieces received at the plurality of workpiece spindles, when the workpiece spindles are positioned at respective machining positions.

In some preferred aspects, the controller may be further configured to control the torque motor for controlling a rotational movement of the turret body for indexing the workpiece spindles between the respective machining positions and/or to control the position locking mechanism for locking the position of the workpiece spindles in the machining positions during the machining of the one or more workpieces.

In some preferred aspects, the controller may be configured to cut a control current of a control signal to the torque motor after a driven rotation of the turret body between the respective machining positions and to actuate the locking position locking mechanism before controlling the machining of the one or more workpieces; and/or the controller may be configured to loosen the locked position locking mechanism and to activate a control current of a control signal to the torque motor for driving a rotation of the turret body to the next respective machining positions after machining of the one or more workpieces at the current machining positions.

In addition or alternative to the above, independently or separately, the present invention further proposes a bar loader (or a combination of a machine tool with a bar loader, wherein the machine tool may be a single-spindle, double-spindle or multi-spindle lathe or turning machine). The bar loader may be configured to supply elongated workpieces, e.g. bars, from the rear side of the machine tool into the respective workpiece spindles of the one or more workpiece spindles of the machine tool. A main aspect of such bar loader may be that a bar loader guiding system is provided that includes three portions, including a fixed guide portion, a slidable middle guide portion and a slidable end guide portion. The slidable portions being arranged to have individual guides for each associated spindle which are respectively slidable into a direction of a spindle axis of its respective associated workpiece spindle. Such aspects may be provided for single-spindle, double-spindle or multi-spindle lathe or turning machines, in case of multi-spindle machines with or without rotary turret body.

BRIEF DESCRIPTION OF THE DRAWINGS

FIGS. 8A to 8C exemplary illustrate schematic perspective views of a multi-spindle turning machine according to yet another exemplary embodiment;

DETAILED DESCRIPTION OF THE DRAWINGS AND DESCRIPTION OF EXEMPLARY EMBODIMENTS

Figure 1:
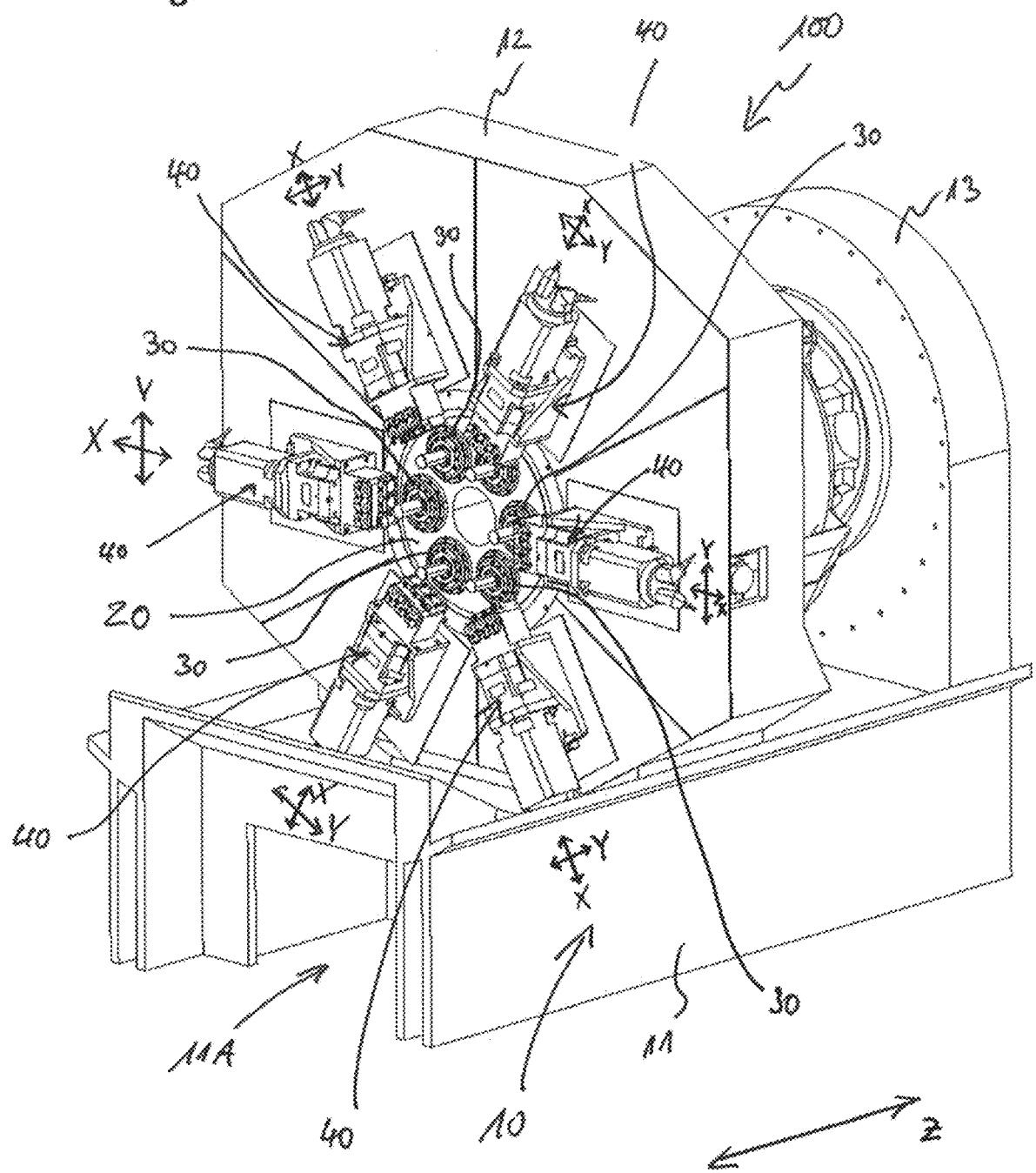
FIG. 1 exemplarily illustrates a schematic perspective view of a multi-spindle turning machine according to an exemplary embodiment.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1 exemplarily illustrates a schematic perspective view of a multi-spindle turning machine 100 according to an exemplary embodiment.

The multi-spindle turning machine 100 of FIG. 1 comprises a machine frame 10 which includes a machine bed 11, a first machine frame upright 12 (front frame portion) and a second machine frame upright 13 (back frame portion), wherein the first machine frame upright 12 and the second machine frame upright 13 are arranged on the machine bed 11.

A turret body 20 (spindle drum) is rotatably supported by the first machine frame upright 12 and the second machine frame upright 13 of the machine frame 10 of the multi-spindle turning machine 100. The turret body 20 supports a plurality of workpiece spindles 30, exemplarily arranged such that a respective spindle axis of the workpiece spindles 30 is arranged in parallel with the rotational axis (longitudinal axis) of the turret body 20. Specifically, the workpiece spindles 30 are exemplarily arranged around the rotational axis (longitudinal axis) of the turret body 20, exemplarily with equiangular distance.

The turret body 20 is rotatably supported by each of the first and second machine frame uprights 12 and 13, and a free space is provided between the first and second machine frame uprights 12 and 13, so that exemplarily the turret body 20 is only supported by the two machine frame uprights 12 and 13. Specifically, exemplarily a front end portion of the turret body 20 is rotatably supported by the first machine frame upright 12 (front frame portion) and a back end portion of the turret body 20 is rotatably supported by the second machine frame upright 13 (back frame portion).

In FIG. 1, the turret body 20 exemplarily carries six workpiece spindles 30, but the invention is not limited to configurations with six workpiece spindles 30 arranged on the turret body 20, but the number of spindles can be also less or more than six, e.g. a turret body carrying four, five, seven, eight or more workpiece spindles. Exemplarily, for six workpiece spindles 30, the equiangular distance between the respective adjacent workpiece spindles is ⅙ of 360°, i.e. exemplarily 60°.

Further exemplarily, the first machine frame upright 12 (front frame portion) supports, for each of the workpiece spindles 30, a respective tool post assembly 40 for carrying tools for processing/machining workpieces received at the respective workpiece spindles 30. Accordingly, in the present example, the first machine frame upright 12 (front frame portion) supports six tool post assemblies 40, exemplarily at the similar equiangular distance between adjacent tool post assemblies as the equiangular distance between adjacent workpiece spindles 30.

By such configuration, in a machining position of the turret body, each of the tool post assemblies 40 is positioned so as to be enabled to process a workpiece held by the currently associated workpiece spindle 30, and by indexing (rotating) the turret body 20, each of the workpiece spindles 30 can be moved to the next position of the next tool post assembly 40. Accordingly, the turret body 20 is configured to index/rotate the workpiece spindles 40 between the multiple machining positions of the respective tool post assemblies 40. Such rotation (indexing) of the turret body 20 can be made in clockwise and/or anti-clockwise direction.

Regarding the movement kinematics of the multi-spindle turning machine 100, exemplarily, the one or more tools held by each of the tool post assemblies 40 can exemplarily be moved relative to the workpiece received at a respective workpiece spindle 30 in three translational directions (three linear degrees of freedom). Exemplarily, this is achieved in that each workpiece spindle 30 is moveable in a longitudinal direction which is axially arranged with respect to the respective spindle axis (referred to as "Z-direction"; Z-axis), and in that each tool post assembly 40 can be moved independently in two linear directions which are exemplarily perpendicular to each other and perpendicular to the longitudinal direction (Z-direction). Such directions are exemplarily referred to as "X-direction" (X axis) and "Y-direction" (Y axis).

Exemplarily, for each tool post assembly 40 the respective X-direction is arranged radially with respect to the rotational axis of the turret body 20 (i.e. the respective tool post assembly 40 can be moved in the X-direction perpendicular to and radially with respect to the rotational axis of the turret body 20), i.e. exemplarily perpendicular to the Z-direction of the respective workpiece spindle 30.

Exemplarily, for each tool post assembly 40 the respective Y-direction is arranged tangentially with respect to the rotational axis of the turret body 20 (i.e. the respective tool post assembly 40 can be moved in the Y-direction perpendicular to and tangentially with respect to the rotational axis of the turret body 20), i.e. exemplarily preferably perpendicular to the Z-direction of the respective workpiece spindle 30 and perpendicular to the respective X-direction of said respective tool post assembly 40.

On the side of the first machine frame upright 12 (front frame portion) opposite to the second machine frame upright 13 (back frame portion), a workspace is provided, on which side thereof the tool post assemblies 40 are provided on the first machine frame upright 12.

Below the tool post assemblies 40, exemplarily, a chip fall opening is provided in the machine bed 11 of the machine frame 10, and a conveyor opening 11A is provided in the machine bed 11 of the machine frame 10 on a front side thereof, and the conveyor opening 11A is provided to insert a chip conveyor (see exemplary embodiments below). An advantage is that chips being created by the machining processes of machining workpieces received at the workpiece spindles 30 by tools held by the tool post assemblies 40 can fall freely downwards from the spindle positions to fall through the chip fall opening into a chip collector portion of a chip conveyor inserted through the conveyor opening 11A.

Figure 2A:
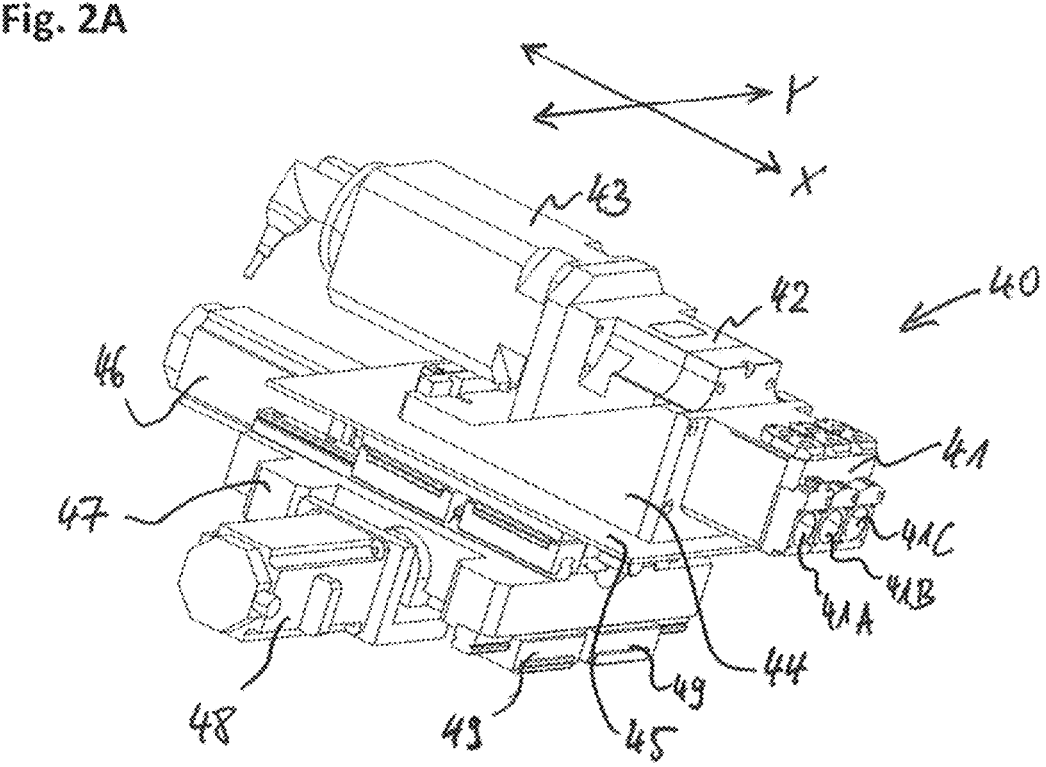
FIGS. 2A and 2B exemplarily illustrate schematic perspective views of a tool post assembly of the multi-spindle turning machine of FIG. 1.
Figure 2B:
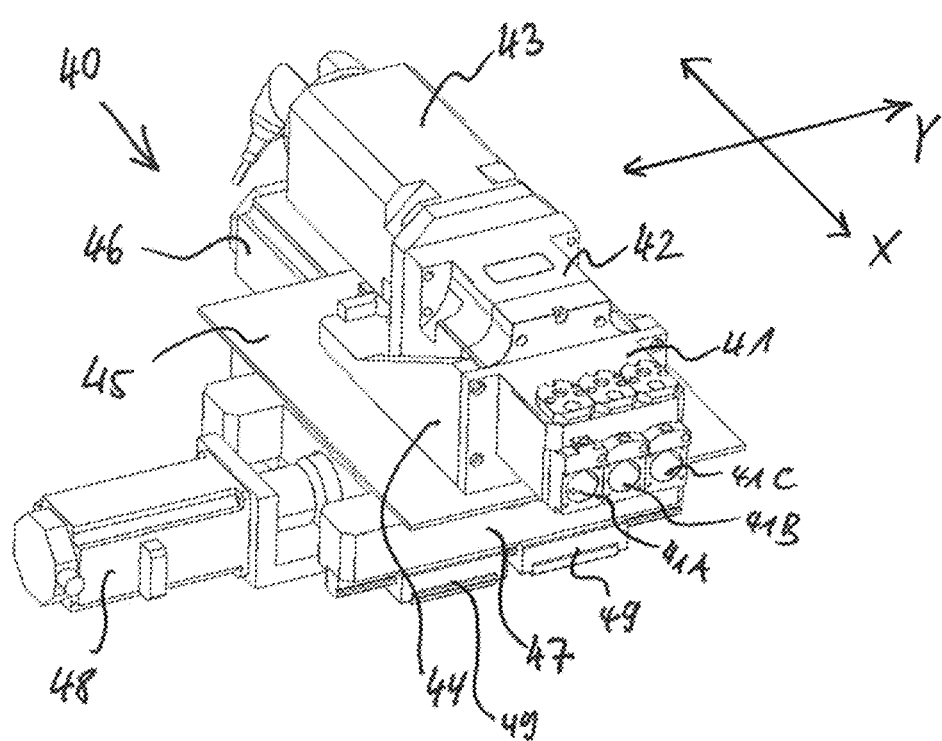

FIGS. 2A and 2B exemplarily illustrate schematic perspective views of a tool post assembly 40 of the multi-spindle turning machine of FIG. 1.

Exemplarily, each of the tool post assemblies 40 of the multi-spindle turning machine of FIG. 1 are configured similarly, only that they are mounted to the first machine frame upright 12 (front frame portion) on the face side facing the workspace such that the respective X- and Y-axes, which exemplarily are arranged perpendicularly with respect to each other, are arranged depending on the longitudinal axis of the turret body, e.g. in that the plane spanned by the respective X- and Y-axes is arranged perpendicular to the longitudinal axis of the turret body 20 (i.e. that each of the respective X- and Y-axes is arranged perpendicular to the longitudinal axis of the turret body 20), and in that the respective X-axis is arranged radially with respect to the longitudinal axis (rotational axis) of the turret body 20.

For providing the X- and Y-axes, the tool post assembly 40 exemplarily comprises a cross slide assembly including a first slide 45 (X-slide) movable in the X-direction and a second slide 47 (Y-slide) movable in the Y-direction, wherein the first slide 45 (X-slide) is arranged on the second slide 47 (Y-slide) as exemplarily shown in FIGS. 2A and 2B.

The tool post assemblies 40 further exemplarily comprise respective drives 46 and 48, wherein the drive 46 (e.g. drive motor) is configured to drive the linear movement of the first slide 45 (X-slide) into the X-direction and the drive 48 (e.g. drive motor) is configured to drive the linear movement of the second slide 47 (Y-slide) into the Y-direction.

The X- and Y-direction movements can be independently driven and by simultaneously driving the X- and Y-direction movements, the tool post can be moved in any direction within the plane of the X- and Y-directions, perpendicularly to the longitudinal axis of the turret body 20 and perpendicular to the respective spindle axis of a respective workpiece spindle 30.

The guide elements 49, along which guides of the second slide 47 (Y-slide) are guided, are mountable to the first machine frame upright 12 (front frame portion) at the respective positions as shown in FIG. 1, for example.

Exemplarily, each of the tool post assemblies 40 of the multi-spindle turning machine of FIG. 1, as exemplarily shown in FIGS. 2A and 2B, comprises a tool post 41 which has a plurality (exemplarily three) tool receiving openings 41A, 41B and 41C for receiving tools. Exemplarily, the tool receiving openings 41A, 41B and 41C are arranged adjacent to each other and are arranged along the Y-direction.

This has the advantage that, by moving the tool post 41 into the Y-direction, the respective tool, which actually engages the workpiece received at the respective workpiece spindle, can be changed among the tools received in the tool receiving openings 41A, 41B and 41C. Accordingly, without actually inserting a new tool into the tool post 41, the tools engaging into the machining operation at a respective workpiece spindle 30 can be quickly, efficiently and reliably changed by merely moving the tool post 41 into the Y-direction.

Also, the tool post assembly 40 is configured to drive tools received in the tool receiving openings 41A, 41B and 41C (so-called live tools) by way of the optional drive mechanism including the drive 43 (e.g. a drive motor in a drive housing) and the gearbox 42. Specifically, the gearbox 42 may include a gear mechanism, which may be configured to allow for one or more gear changes for different gear ratios, and the gear mechanism may be driven by the drive 43 so as to drive one or more of the tools received in the tool receiving openings 41A, 41B and 41C.

For example, the gearbox may be configured to include a gear mechanism which may be set to (or switched between) one or more gear settings, which may be provided for driving one or more of the tools received in the tool receiving openings 41A, 41B and 41C at high revolution speeds and/or high torque, e.g. depending on the intended machining condition and/or depending on the used live tool.

Figure 3A:
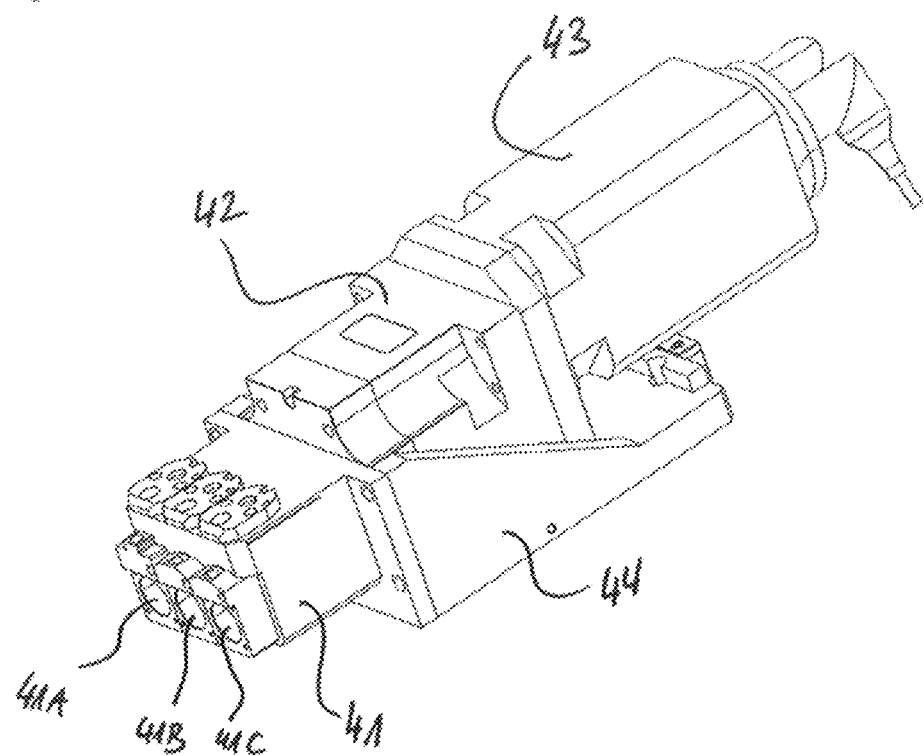
FIGS. 3A and 3B exemplarily illustrate schematic perspective views of tool posts of the multi-spindle turning machine of FIG. 1.
Figure 3B:
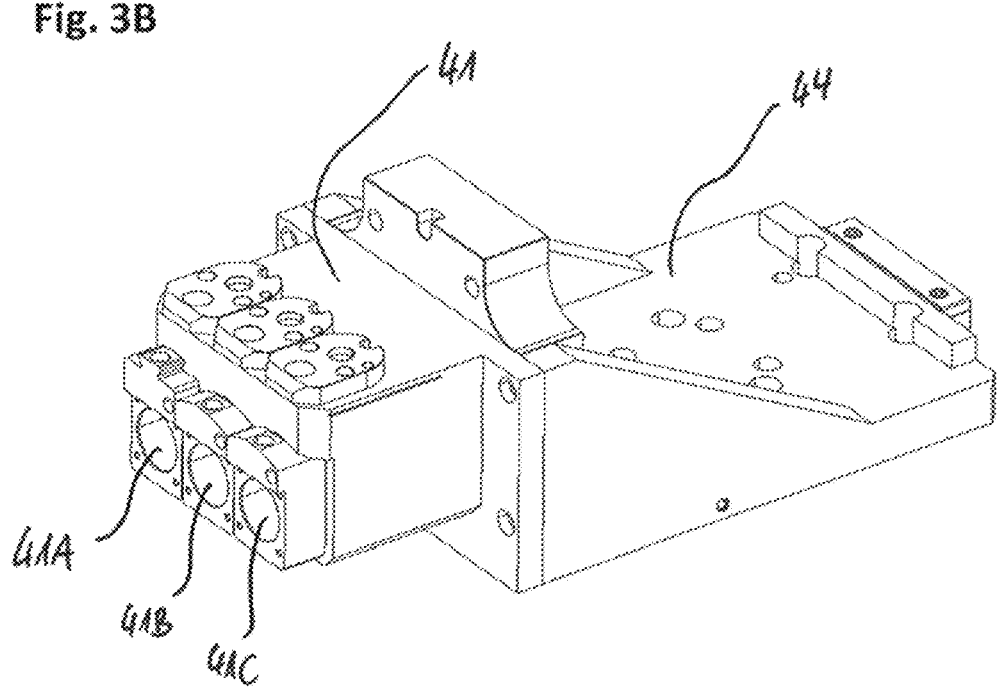

FIGS. 3A and 3B exemplarily illustrate schematic perspective views of tool posts of the multi-spindle turning machine of FIG. 1.

Exemplarily, FIG. 3A illustrates a tool post 41 with the mounting portion 44 on which the drive 43 (exemplarily including a housing and a drive motor being arranged in the housing) and the gearbox 42 are mounted, and FIG. 3B illustrates a tool post 41 with the mounting portion 44 from which the drive 43 and the gearbox 42 are detached.

That is, the drive 43 (e.g. drive motor) and the gearbox 42 may be optional in the sense that the tool post assembly 40 may be configured to detachably mount the drive unit including the drive 43 and the gearbox 42 to the tool post 41, e.g., on a mounting portion 44 which is exemplarily arranged on the first slide 45 (X-slide) and which exemplarily supports the tool post 41. Accordingly, if no live tools are intended to be used or required, the drive unit including the drive 43 and the gearbox 42 may be demounted or detached from the tool post 41, e.g. if only fixed tools (e.g. fixed cutter blades) are inserted to the tool receiving openings 41A, 41B and 41C.

Exemplarily, in FIGS. 3A and 3B, the drive 43 and the gearbox 42 may be mechanically fixed to the mounting portion 44, e.g., by way of screws or the like. In other exemplary embodiments, the drive 43 and the gearbox 42 may be mechanically fixed to the tool post 41 directly. In yet further exemplary embodiments, the drive 43 and the gearbox 42 may be mounted to the mounting portion 44 and/or the tool post 41 and locked mechanically and/or by electric, pneumatic and/or hydraulic locking mechanisms.

Figure 4A:
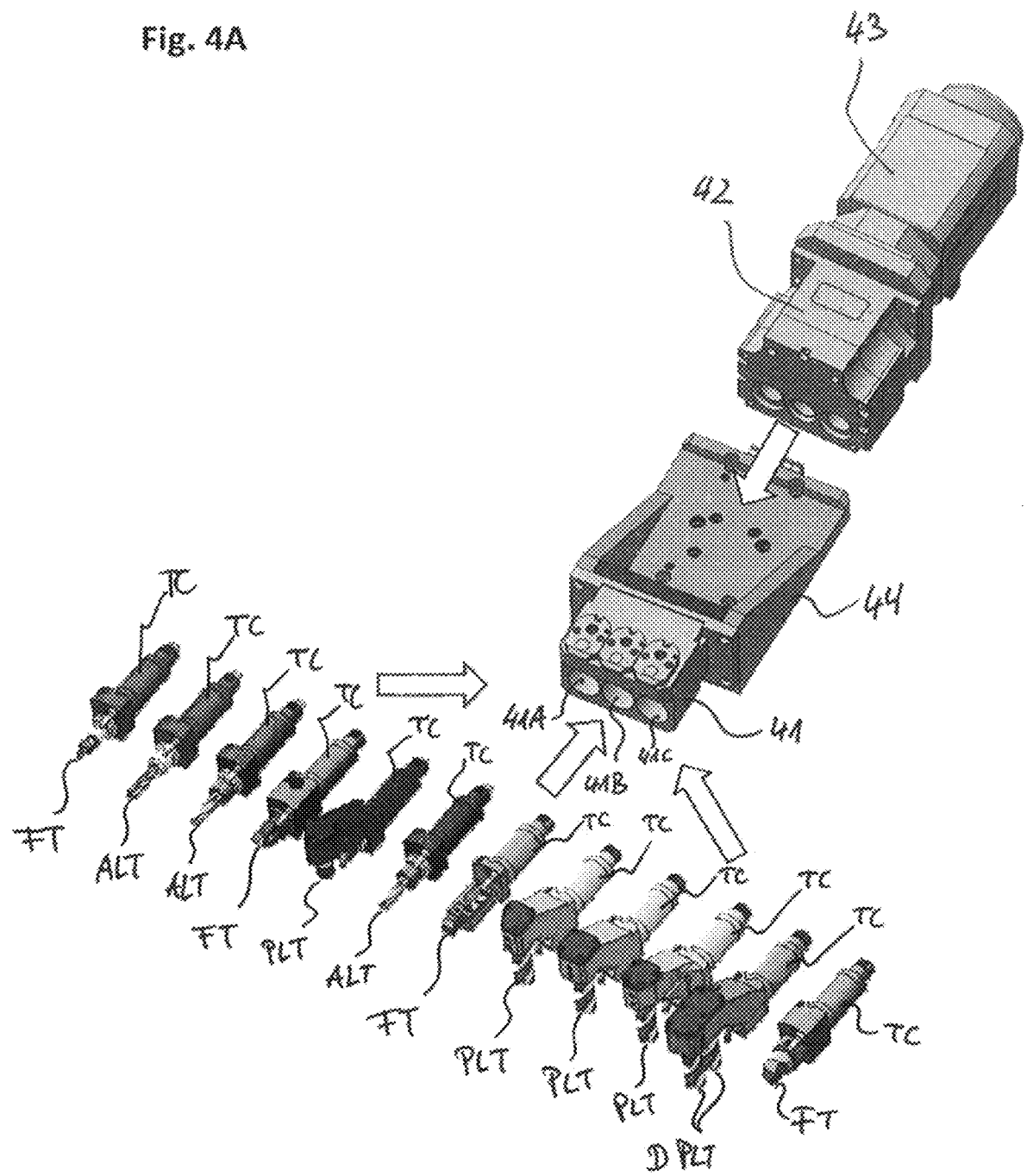
FIGS. 4A and 4B exemplarily illustrate schematic perspective views of a tool post system of the multi-spindle turning machine of FIG. 1.
Figure 4B:
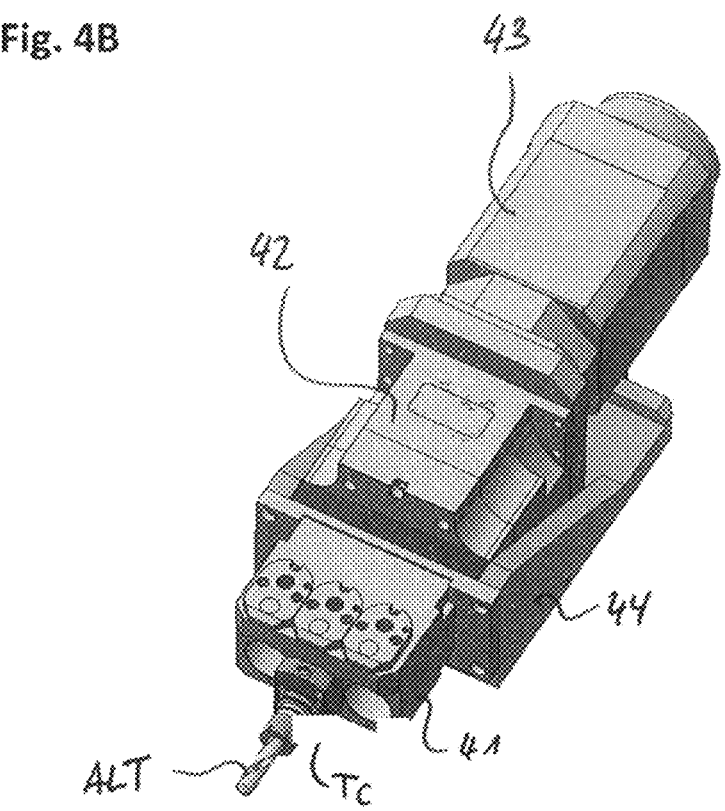

FIGS. 4A and 4B exemplarily illustrate schematic perspective views of a tool post system of the multi-spindle turning machine of FIG. 1. Exemplarily, according to FIGS. 4A and 4B, the tool post system has a configuration that the tool receiving openings 41A, 41B and 41C of the tool post 41 are adapted to receive detachable, replaceable and interchangeable tool holder cartridges TC which are configured to hold respective tools.

For example, FIG. 4A exemplarily illustrates a plurality of interchangeable tool holder cartridges TC, each of which can be inserted into the tool receiving openings 41A, 41B and 41C of the tool post 41 which may, depending on the intended machining operations and the used tools, be optionally augmented with the optionally added drive 43 and the gearbox 42 to be detachably mounted to the mounting portion 44 (and/or the tool post 41), as exemplarily described above.

The plural tool holder cartridges TC, having the interchangeable cartridge design to be fitted into the fitting tool receiving openings 41A, 41B and 41C (as cartridge-receiving openings), are adapted to hold a variety of different tools such as fixed tools FT in FIG. 4A (e.g. fixed blades, fixed cutters, etc.) or live tools (i.e. drivable tools) such as boring tools, milling tools, drill bits, etc. For such live tools, some of the cartridges TC are adapted to hold axially arranged live tools ALT which are rotationally driven about a tool axis arranged axially with a longitudinal axis of the respective cartridge TC, the longitudinal axis of the respective cartridge TC being the axis of the insertion direction into the tool receiving openings 41A, 41B and 41C (as cartridge-receiving openings).

Exemplarily, some of the cartridges TC are adapted to hold vertically/perpendicularly arranged live tools PLT which are rotationally driven about a tool axis arranged perpendicularly with respect to the longitudinal axis of the respective cartridge TC. Further exemplarily, one of the cartridges TC is adapted to hold a vertically/perpendicularly arranged double live tool DPLT with two tools which are rotationally driven about a tool axis arranged perpendicularly with respect to the longitudinal axis of the respective cartridge TC.

Accordingly, while each of the plural tool cartridges TC has the same interface fitting end portion to fit into the tool receiving openings 41A, 41B and 41C (as cartridge-receiving openings), a front portion of the plural tool cartridges TC may be adapted according to different types of tools, e.g. to receive/hold one or more fixed tools FT, to receive/hold an axially drivable tool ALT, to receive/hold a perpendicularly drivable tool PLT (perpendicular live tool) or even to receive/hold one or more drivable tools, such as axially drivable double tools and perpendicularly drivable double tools, etc.

Whenever it is intended to use at least one live tool (drivable tool) at the tool post 41, the optionally available drive unit including the gear box 42 and the drive 43 can be detachably mounted as exemplarily illustrated in FIG. 4A.

Exemplarily, FIG. 4B illustrates such situation in which a tool cartridge TC holding an axially drivable tool ALT (axial live tool) is exemplarily inserted into the tool receiving opening 41B of the tool post 41, and, for driving the axially drivable tool ALT, the gear box 42 and the drive 43 are exemplarily mounted to the mounting portion 44 (and/or to the tool post 41).

For fixedly holding the tool cartridges in the tool receiving openings 41A, 41B and 41C (as cartridge-receiving openings), the tool post 41 may be configured to enable mechanical fixing or locking the received cartridges TC, e.g. by means of screws and/or a clamping or other mechanical locking mechanism, e.g. also including quick-acting fasteners or quick clamps.

In further exemplary embodiments, in alternative or in addition, the tool post 41 may be equipped with automatically actuated locking/unlocking mechanisms to automatically lock/unlock tool cartridges TC received in the tool receiving openings 41A, 41B and 41C (as cartridge-receiving openings) of the tool post 41. Specifically, such automatically actuated locking/unlocking mechanisms may be including mechanical, pneumatic, hydraulic and/or electric locking/unlocking mechanisms. Accordingly, locking/unlocking tool cartridges TC received in the tool receiving openings 41A, 41B and 41C (as cartridge-receiving openings) of the tool post 41 may be actuated automatically by way of mechanical, pneumatic, hydraulic and/or electric actuators.

This would exemplarily advantageously allow for a possibility of an automatic tool change function to be provided at the multi-spindle turning machine. While automatic tool change mechanisms are well known in the field of machine tools with tool-carrying spindles, such as milling machines or milling machining centers, efficient and reliable automatic tool change mechanisms are not yet realized in the field of turning machines/lathes, specifically for multi-spindle turning machine, and therefore such automatic tool change system at a turning machine, such as a multi-spindle turning machine, is highly beneficial and significantly improves the versatility of the respective turning machine.

For example, in case of equipping a multiple-spindle turning machine with handing robots, such robots could be used to handle workpieces at the workpiece spindles (e.g. for workpiece removal after the machining process) and/or tools to be removed from or inserted to the tool post 41 of one of the tool post assemblies 40 (see below exemplary embodiments).

Even without automatically actuated locking/unlocking mechanisms, the highly flexible and efficiently usable tool cartridge system with plural interchangeable tool holding cartridges fitted to the tool receiving openings 41A, 41B, and 41C of the tool post 41 makes it advantageously possible to efficiently, more quickly and accurately enable tool exchanges, be it made manually, automatically or semi-automatically, at the turning machine, such as the multi-spindle turning machine.

Figure 5:
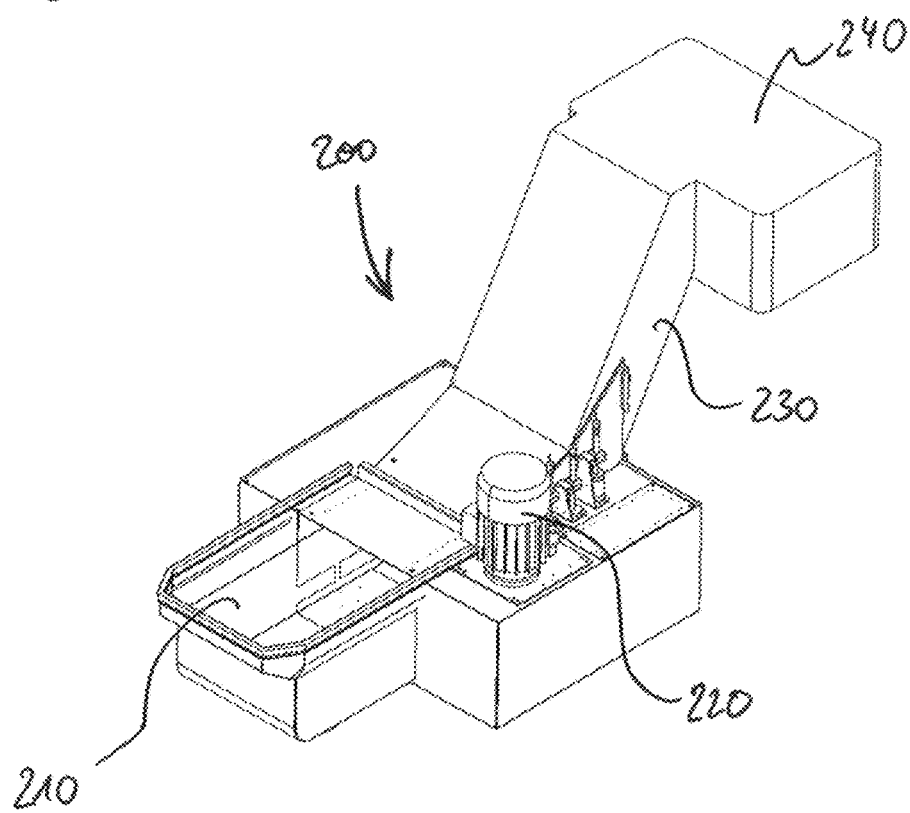
FIG. 5 exemplarily illustrates a schematic perspective view of a chip conveyor for use at the multi-spindle turning machine of FIG. 1.

FIG. 5 exemplarily illustrates a schematic perspective view of a chip conveyor 200 for use at the multi-spindle turning machine 100 of FIG. 1.

Exemplarily, the chip conveyor 200 (chip conveyor apparatus) includes a chip collector portion 210 which is opened to the upper side. The chip collector portion 210 may be inserted into the chip conveyor opening 11A of the machine bed 11 of the machine frame 10 of the multi-spindle turning machine, e.g. as illustrated in FIG. 1. Accordingly, when inserted in the conveyor opening 11A, the chips created by the machining operations of workpieces received at the workpiece spindles 30 being machined by the tools of the tool post assemblies 40 will advantageously be enabled to fall straight down into the chip collector portion 210 of the chip conveyor 200.

The chip conveyor 200 exemplarily further includes an inclined conveying portion 230 which internally has a conveyor system for conveying chips collected in the chip collector portion 210 upwards towards the chip output portion 240, which has a lower opening to output conveyed chips, e.g. into a collector container that may be placed under the chip output portion 240. For driving the conveyor system, the chip conveyor 200 further includes a conveyor drive 220.

Figure 6A:
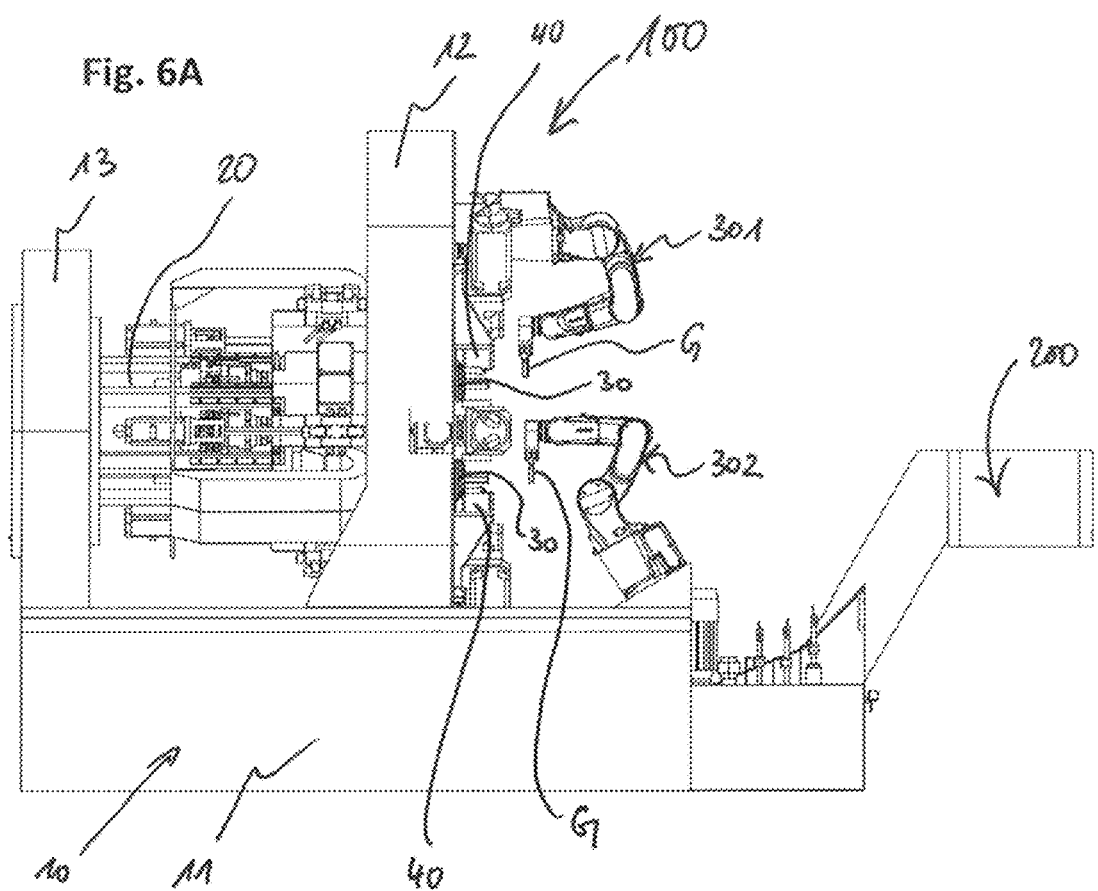
FIGS. 6A and 6B exemplary illustrate schematic perspective views of a multi-spindle turning machine according to another exemplary embodiment.
Figure 6B:
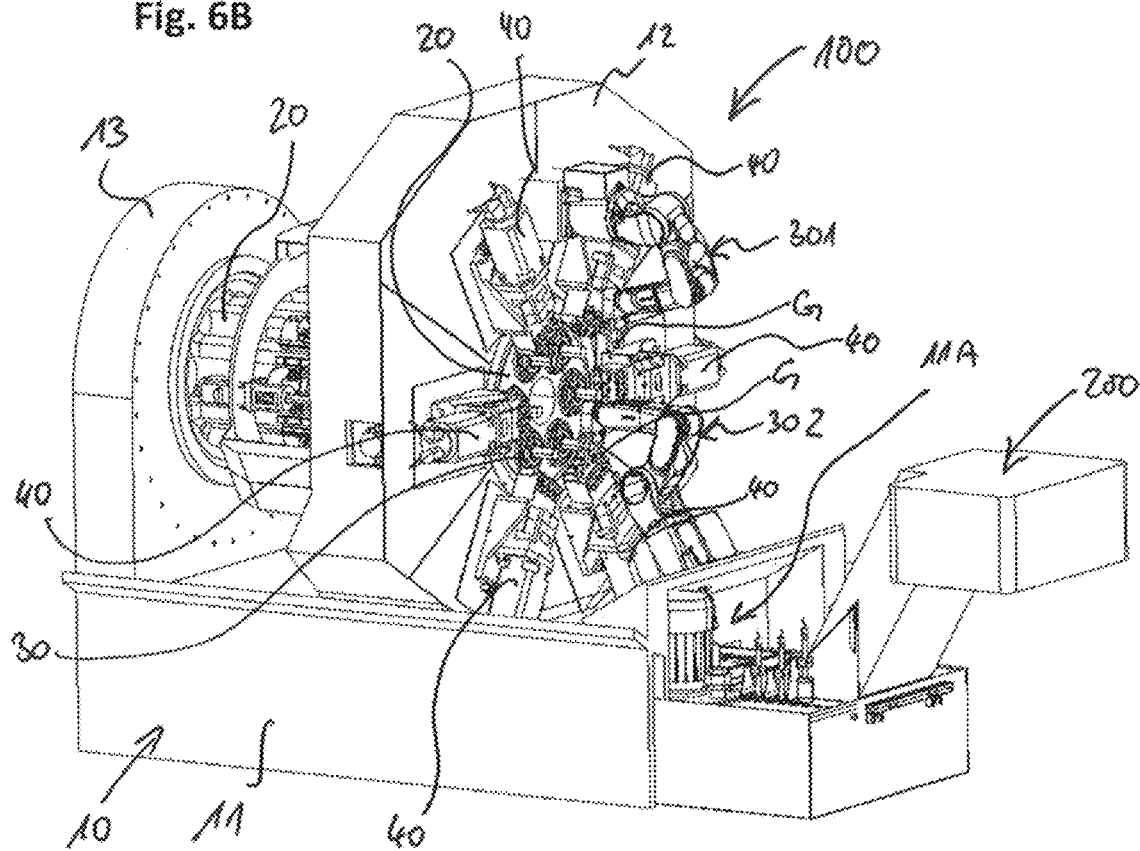

FIGS. 6A and 6B exemplary illustrate schematic perspective views of a multi-spindle turning machine 100 according to another exemplary embodiment.

The principle configuration of the multi-spindle turning machine 100 of FIGS. 6A and 6B is similar to the exemplary embodiments discussed above in connection with FIG. 1. However, the chip conveyor 200 is exemplarily inserted into the conveyor opening 11A of the machine bed 11 of the machine frame 10.

Further exemplarily, the multi-spindle turning machine 100 of FIGS. 6A and 6B is exemplarily equipped with two automatically controlled robots 301 and 302 (exemplarily, six-axis robots). For example, the first robot 301 is mounted to an upper portion of the workspace facing side of the first machine frame upright 12 (front frame portion) of the machine frame 10. The second robot 302 is exemplarily mounted to a portion of the machine bed 11 of the machine frame 10 opposite to the first machine frame upright 12 with respect to the workspace (i.e. a region above the chip fall opening formed in the machine bed 11 of the machine frame 10).

Exemplarily, both of the robots 301 and 302 include grippers G adapted to pick up workpieces from the workpiece spindles 30 (e.g. to remove workpieces after completion of the machining process) and/or adapted to pick up (and/or insert) tool cartridges TC at the tool posts 41 of the tool post assemblies 41, e.g. for automated tool exchanges. The exemplary embodiments are not limited to configurations having two robots but also only one of the robots 301 or 302 may be provided, or additional robots may be provided in yet further exemplary embodiments.

Figure 7A:
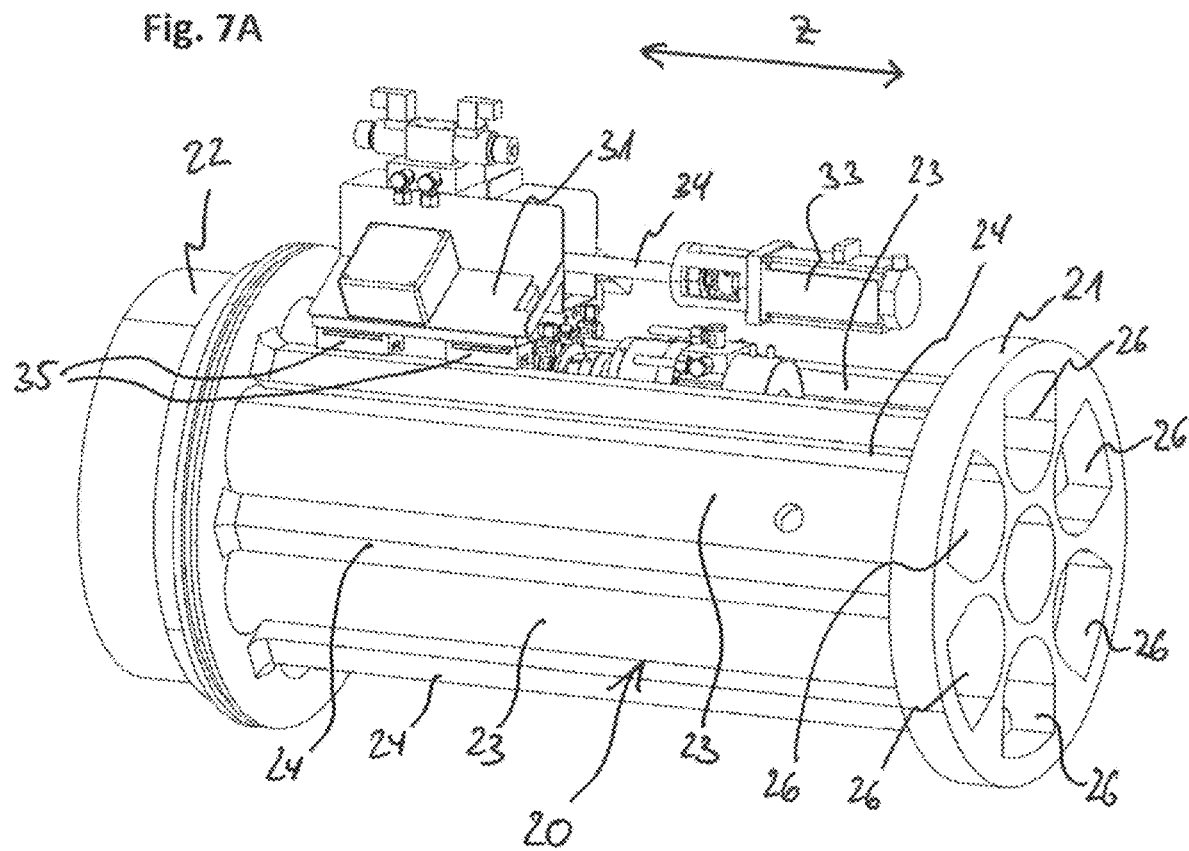
FIGS. 7A and 7B exemplarily illustrate schematic perspective views of a drum of the multi-spindle turning machines of FIGS. 1, 6A and 6B.
Figure 7B:
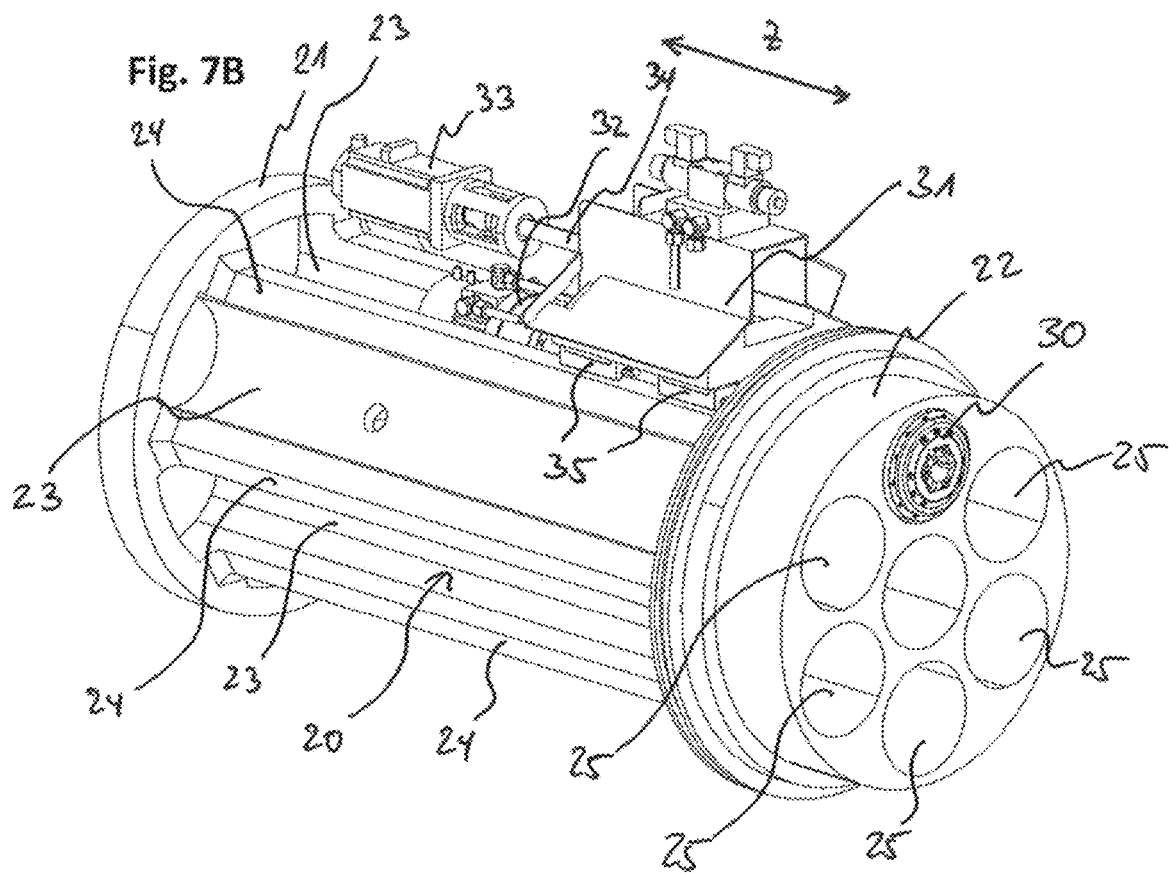

FIGS. 7A and 7B exemplarily illustrate schematic perspective views of a drum (turret body 20) of the multi-spindle turning machines 100 of FIGS. 1, 6A and 6B.

Exemplarily, only the turret body 20 is shown with one exemplary spindle slide mechanism of a respective workpiece spindle 30, wherein the spindle slide mechanism includes a spindle slide 31 which supports a spindle body 32 which includes an integrated spindle drive (built-in spindle motor) and a actuated locking mechanism (e.g. a mechanically, hydraulically, pneumatically and/or electrically actuated locking mechanism) to automatically lock received workpieces (such as e.g. bars) in the spindle to rotatively drive the received and locked workpieces by the spindle drive.

The turret body 20 exemplarily includes a front end portion 22 and a back end portion 21 which are the portions respectively supported rotatably by the front frame portion 12 and the back frame portion 13 of the machine frame 10. The front end portion 22 of the turret body 20 includes openings 25 to receive the workpiece spindles 30 (specifically the front portions thereof), and the back end portion 21 of the turret body 20 includes openings 26 through which each of the spindles 30 may be supplied with workpieces (such as e.g. bars) from a backside of the multi-spindle turning machine 100. This has the advantage that workpieces, such as e.g. long bars, do not need to be inserted from a workspace side but may be supplied/inserted by a bar loader or bar feeder from a backside of the machine, where more space may be available. Then, workpieces only may need to be removed after machining from a front side at the working space, when such workpieces may be easier to be handled, e.g. automatically by external handling robots or additionally integrated robots such as e.g. in FIGS. 6A and 6B.

However, as can be seen from FIGS. 7A and 7B, exemplarily, the turret body 20 does not have through holes from the front side to the backside of the turret body 20 for each of the spindles 30, as typically known from known multi-spindle turning machines, but the turret body 20 has, for each of the workpiece spindles 20, a respective longitudinal groove 23 extending longitudinally (Z-direction/longitudinal direction of the turret body 20) from the front end portion 22 of the turret body 20 to the back end portion 21 of the turret body 20. The longitudinal grooves 23 are exemplarily opened to the outer circumferential side of the turret body 20 so as to open to the space between the front frame portion 12 and the back frame portion 13 of the machine frame 10.

Exemplarily, the turret body 20 has, between each pair of adjacent grooves 23, a respective ledge portion 24 extending longitudinally (Z-direction/longitudinal direction of the turret body 20) from the front end portion 22 of the turret body 20 to the back end portion 21 of the turret body 20. Exemplarily, the number of grooves 23 is the same as the number of longitudinal ledge portions 24.

The spindle body 32 of the workpiece spindle 30 is exemplarily guided in the respective longitudinal groove 23 and supported by the spindle slide 31 which is arranged at an outer circumferential side of the turret body 20. Specifically, each spindle slide 31 is exemplarily guided, with guide elements 35, on the longitudinal ledge portions 24 formed on the sides of the respective grooves 23.

Such configuration has the advantage that the slides 31 and their drive mechanisms may be provided outside on an outer circumferential side of the turret body 20, so that the turret body 20 can be made efficiently compact and lightweight, since the radiating profile of the turret body 20 having the groove-ledge arrangement gives very high stability and stiffness even at relatively low ledge thickness, and the spindles can be arranged more compactly since the spindle slides and their drive mechanisms can be arranged circumferentially outside of the turret body 20, efficiently using the space between the front and back frame portions 12 and 13, and the size of the slides and their drive mechanism does not need to be compactified, even though the turret body 20 is very compact.

Exemplarily, the slide drive mechanism includes a thread shaft 34 driven by a drive 33 (drive motor). In FIGS. 7A and 7B, the drive 33 is not mounted to the spindle slide 31 but may itself be mounted to a mount structure of (or attached to) the back portion the turret body 20.

When rotatively driving the thread shaft 34 by way of the drive 33, the respective spindle slide 31 is driven in the longitudinal direction (Z-direction, axially with respect to the respective spindle axis) along the guiding ledges 24 so as to move the spindle body 32 of the respective workpiece spindle 30 in the longitudinal Z-direction (e.g. towards or away from the workspace) within the respective longitudinal groove 23.

Figure 8C:
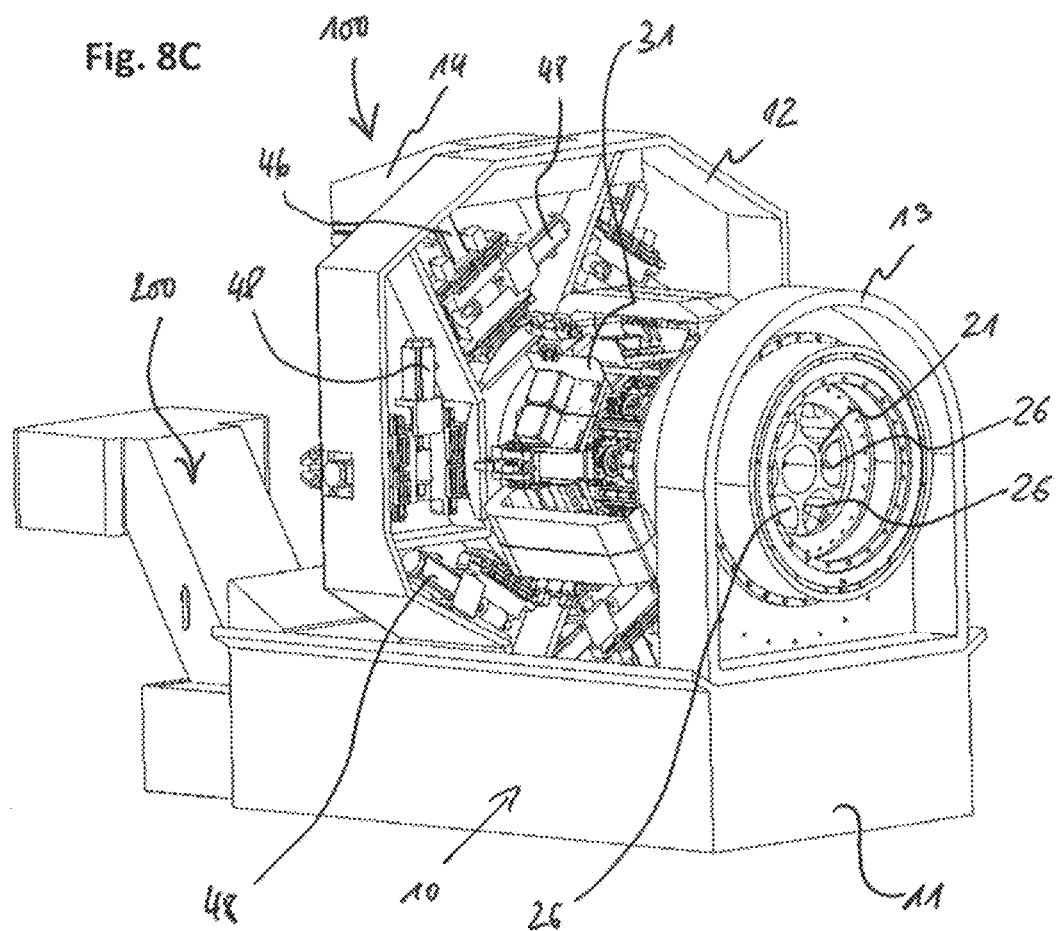

FIGS. 8A to 8C exemplary illustrate schematic perspective views of a multi-spindle turning machine 100 according to yet another exemplary embodiment. The principle configuration of the multi-spindle turning machine 100 of FIGS. 8A to 8C is similar to the exemplary embodiments discussed above in connection with FIGS. 1, 6A and 6B.

Exemplarily, the FIG. 8A illustrates schematically a machine housing 110 of the multi-spindle turning machine 100. FIGS. 8B and 8C illustrate the multi-spindle turning machine 100 without housing 110. Such housing may also be provided for other described exemplary embodiments above and below.

Furthermore, the multi-spindle turning machine 100 of FIGS. 8A to 8C is exemplarily equipped with a chip conveyor 200 as exemplarily shown in FIG. 5, similar as the machine tool of FIGS. 6A and 6B.

In addition, a bar loader 300 is exemplarily shown in FIG. 8A, being arranged on the rear side of the multi-spindle turning machine 100 facing the back frame portion 13 of the machine frame 10, which bar loader 300 is configured to supply elongated workpieces, e.g. bars (e.g. bars with a round or circular cross section or bars with an angled cross section such as e.g. a hexagonal cross section), from the rear side into the respective workpiece spindles 30 through the holes 26 formed in the back end portion 21 of the turret body 20 (see e.g. FIG. 8C). Such bar loader 300 may be used in other exemplary embodiments described above and below.

In addition, different to previously described exemplary embodiments, the multi-spindle turning machine 100 of FIGS. 8A to 8C exemplarily includes a pick-up spindle mechanism 50 which is mounted on a beam portion 14 of the machine frame 10 which is exemplarily arranged on the upper side of the front frame portion 12 and which exemplarily extends from the upper side of the front frame portion 12 into the working space.

The pick-up spindle mechanism 50 with its pick-up spindle 51 is exemplarily arranged in a hanging position being mounted to the beam portion 14 of the machine frame 10 from below and hanging from the beam portion 14 of the machine frame 10. This has the advantage that the pickup-spindle mechanism does not obstruct the free space of chip fall below the spindles (including the pick-up spindle).

The pick-up spindle mechanism 50 includes a support portion 53 which is mounted, in the hanging position, to the bottom side of the beam portion 14 of the machine frame 10, exemplarily by way of guide elements 54 which are guided along a longitudinal direction (Z-direction) in guides arranged on the bottom side of the beam portion 14. The pick-up spindle mechanism 50 exemplarily further includes a drive 56 (drive motor) to drive movement of the support portion 53 (pickup-spindle slide) in the longitudinal direction (Z-direction) towards and away from the opposing workpiece spindles 30.

The support portion 53 supports (holds) the pickup-spindle 51 which is driven by another drive 52 (drive motor), e.g. via a driving belt 55. The pickup-spindle 51 and the drive 52 are arranged on (mounted to) the support portion 53, and by moving the support portion 53 in the longitudinal direction (Z-direction), the pickup-spindle 51 can be moved towards and away from the opposing workpiece spindles 30 for picking up a workpiece received at one of the workpiece spindles 30 for rear machining purposes.

For such rear machining processing, the pickup-spindle may rotatively drive the picked up workpiece, which has a rear side, which was previously received in the respective workpiece spindle 30, now openly facing the workspace for being machined on said rear side, and said rear side of the workpiece may be machined by using the tools of the tool post 40 associated with the respective workpiece spindle 30 opposite of the pickup spindle 51 and/or by way of additional tools (fixed tools or driven tools, i.e. live tools) which may be mounted to or arranged on the support portion 53 or on tool post assemblies mounted to or arranged on the support portion 53.

The configuration advantageously allows for a very efficient and compact configuration allowing for additional rear machining of workpieces with optimized chip fall conditions.

Figure 9:
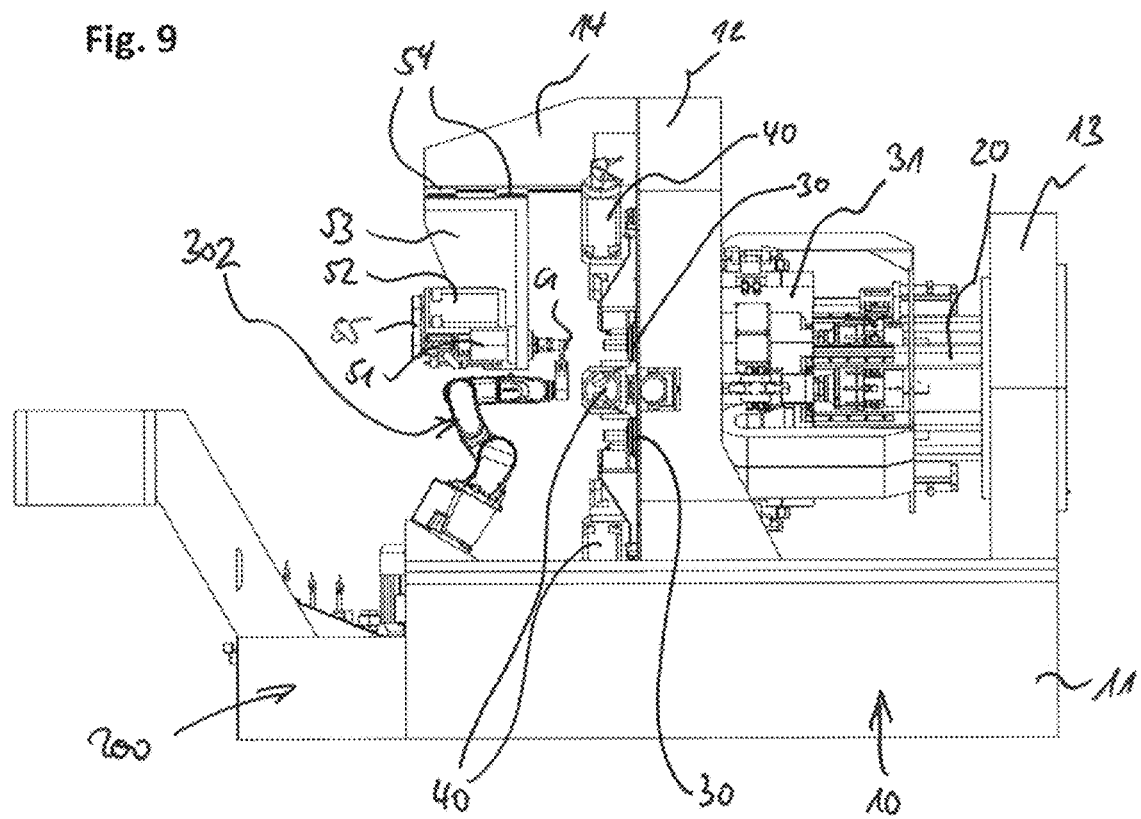
FIG. 9 exemplary illustrates a schematic perspective view of a multi-spindle turning machine according to yet another exemplary embodiment.

FIG. 9 exemplary illustrates a schematic perspective view of a multi-spindle turning machine 100 according to yet another exemplary embodiment, similar to the exemplary embodiments of FIGS. 8A to 8C.

In addition, similar to FIGS. 6A and 6B, the multi-spindle turning machine 100 of FIG. 9 is exemplarily equipped with a robot 302 (exemplarily a six-axis robot). The robot 302 is exemplarily mounted to a portion of the machine bed 11 of the machine frame 10 opposite to the first machine frame upright 12 with respect to the workspace (i.e. a region above the chip fall opening formed in the machine bed 11 of the machine frame 10).

Exemplarily, the robot 302 includes a gripper G adapted to pick up workpieces from the workpiece spindles 30 (e.g. to remove workpieces after completion of the machining process), to pick up workpieces from the pick-up spindle 53 (as exemplarily shown in FIG. 9) and/or adapted to pick up (and/or insert) tool cartridges TC at the tool posts 41 of the tool post assemblies 41, e.g. for automated tool exchanges. The exemplary embodiments are not limited to configurations having one robot but also two or more robots may be provided in yet further exemplary embodiments.

FIGS. 10A to 10D exemplary illustrate schematic perspective views of a multi-spindle turning machine 100 according to yet another exemplary embodiment.

Furthermore, the multi-spindle turning machine 100 of FIGS. 10A to 10D is exemplarily equipped with a chip conveyor 200 as exemplarily shown in FIG. 5, similar as the machine tool of FIGS. 6A and 6B and FIGS. 8A to 9.

Figure 10A:
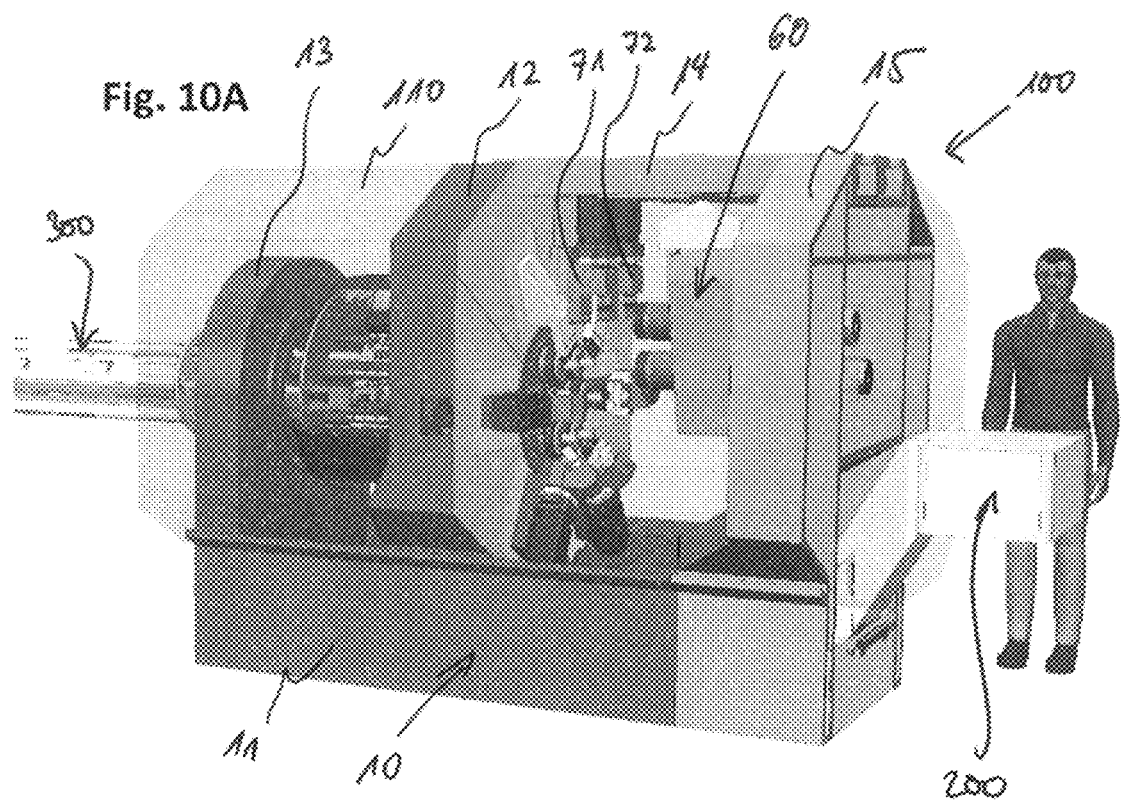
FIGS. 10A to 10D exemplary illustrate schematic perspective views of a multi-spindle turning machine according to yet another exemplary embodiment.
Figure 10B:
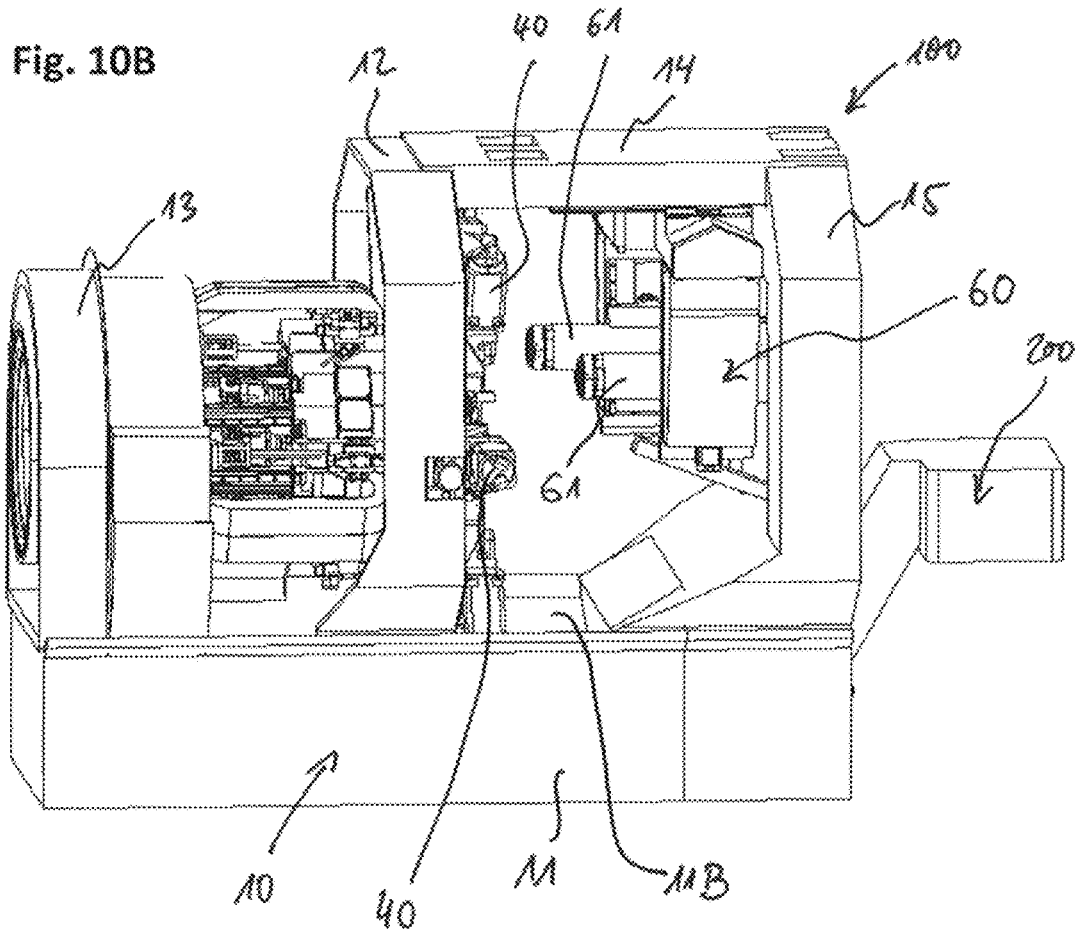
Figure 10C:
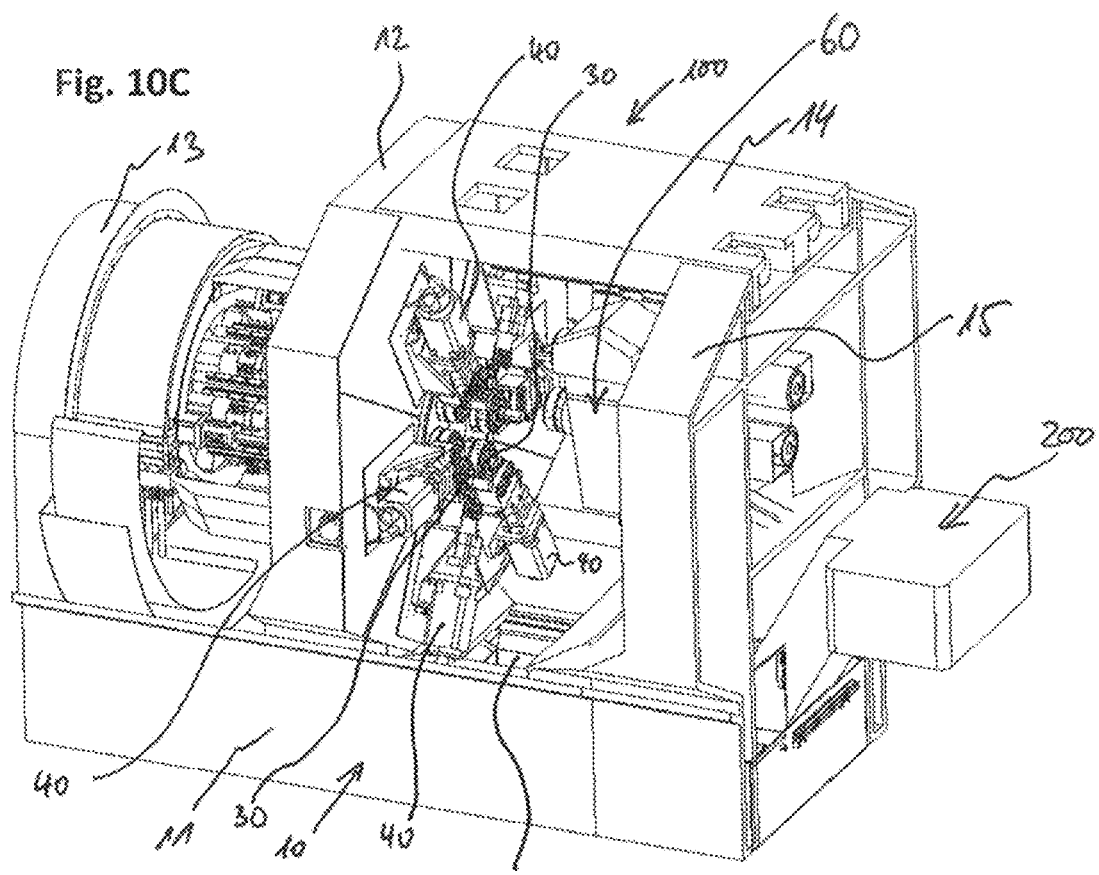
Figure 10D:
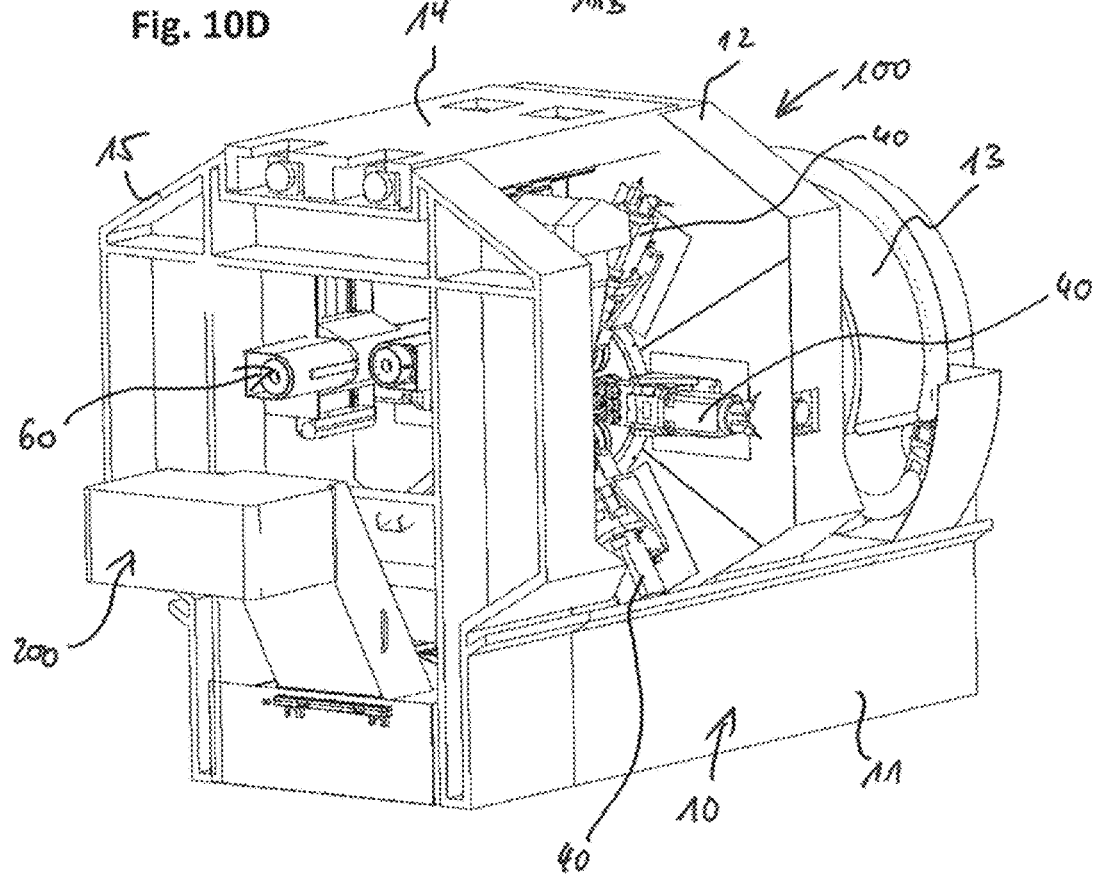

In addition, a bar loader 300 is exemplarily shown in FIG. 10A (similar to FIG. 8A), being arranged on the rear side of the multi-spindle turning machine 100 facing the back frame portion 13 of the machine frame 10, which bar loader 300 is configured to supply elongated workpieces, e.g. bars, from the rear side into the respective workpiece spindles 30 through the holes 26 formed in the back end portion 21 of the turret body 20. Such bar loader 300 may be used in other exemplary embodiments described above and below.

In addition, different to previously described exemplary embodiments, the multi-spindle turning machine 100 of FIGS. 10A to 10D exemplarily includes a counter-spindle mechanism 60 which is mounted on a beam portion 14 of the machine frame 10 which is exemplarily arranged between the upper side of the front frame portion 12 and an upper side of another (third) machine frame upright 15 (third machine frame portion) arranged opposite of the front frame portion 12 with respect to the workspace (opposite of the workpiece spindles 30), and which beam portion 14 exemplarily extends from the upper side of the front frame portion 12 into the working space.

The counter-spindle mechanism 60 exemplarily comprises two counter-spindles 61, however, other exemplary embodiments with one or more than two counter-spindles are also possible in yet further exemplary embodiments.

The counter-spindle mechanism 60 with its counter-spindles 61 is exemplarily arranged in a hanging position being mounted to the beam portion 14 of the machine frame 10 from below and hanging from the beam portion 14 of the machine frame 10. This has the advantage that the counter-spindle mechanism does not obstruct the free space of chip fall below the spindles (including the counter-spindles). Embodiments with two counter-spindles have an advantage that both of double cycle machining operations and double rear machining operations become possible (for double cycle machining operations and double rear machining operations, please see e.g. EP 2 163 334 B2).

Furthermore, as exemplarily shown in FIG. 10A, e.g. for (double) rear machining operations performed on workpieces received at the counter-spindles 61, the multi-spindle turning machine 100 exemplarily further comprises two additional tool posts 71 and 72, which are exemplarily arranged in a hanging position mounted to the bottom side of the beam portion 14 between the counter-spindles 61 of the counter-spindle mechanism 60 and the workpiece spindles 30. Each of the tool posts 71 and 72 is adapted to hold one or more tools (including fixed tools and/or drivable tools, e.g. live tools).

The exemplary embodiment exemplarily comprises two additional tool posts 71 and 72 for rear machining purposes of workpieces received at the counter-spindles 61, however, other exemplary embodiments with one or more than two additional tool posts are also possible in yet further exemplary embodiments.

Figure 11A:
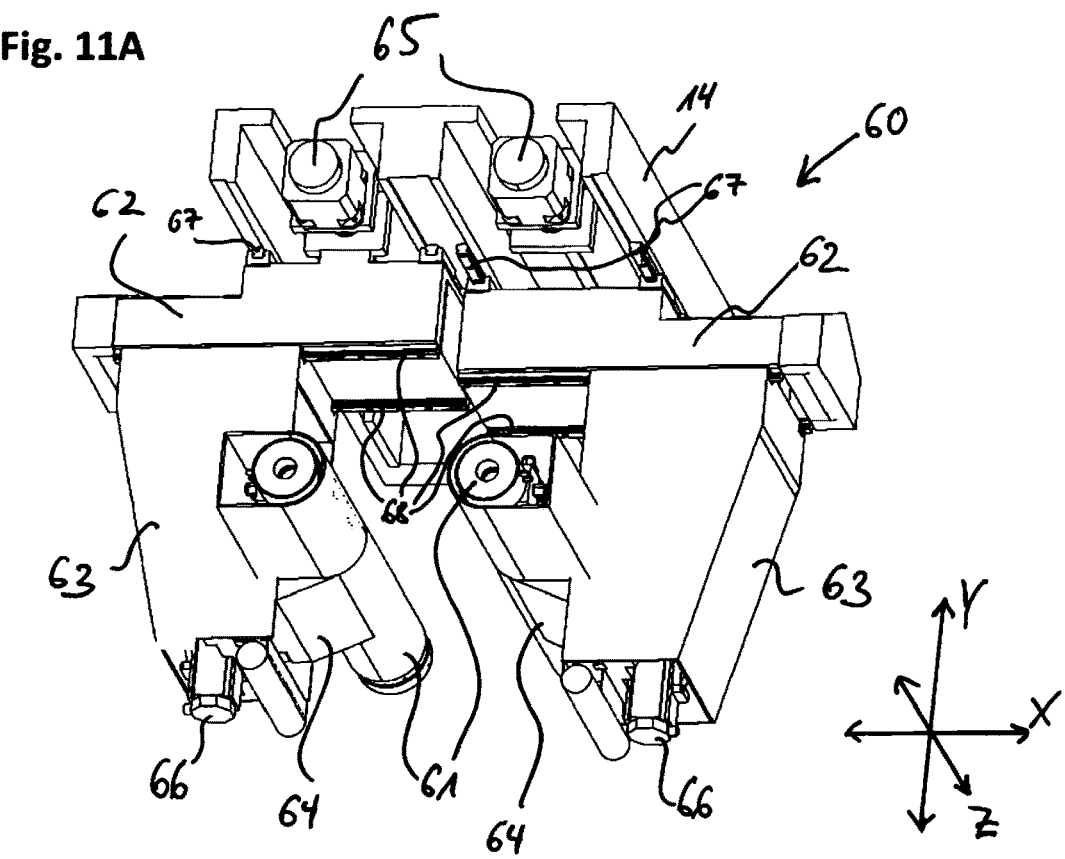
FIGS. 11A and 11B exemplary illustrate schematic perspective views of a counter-spindle assembly of the multi-spindle turning machines according to FIGS. 10A to 10D.
Figure 11B:
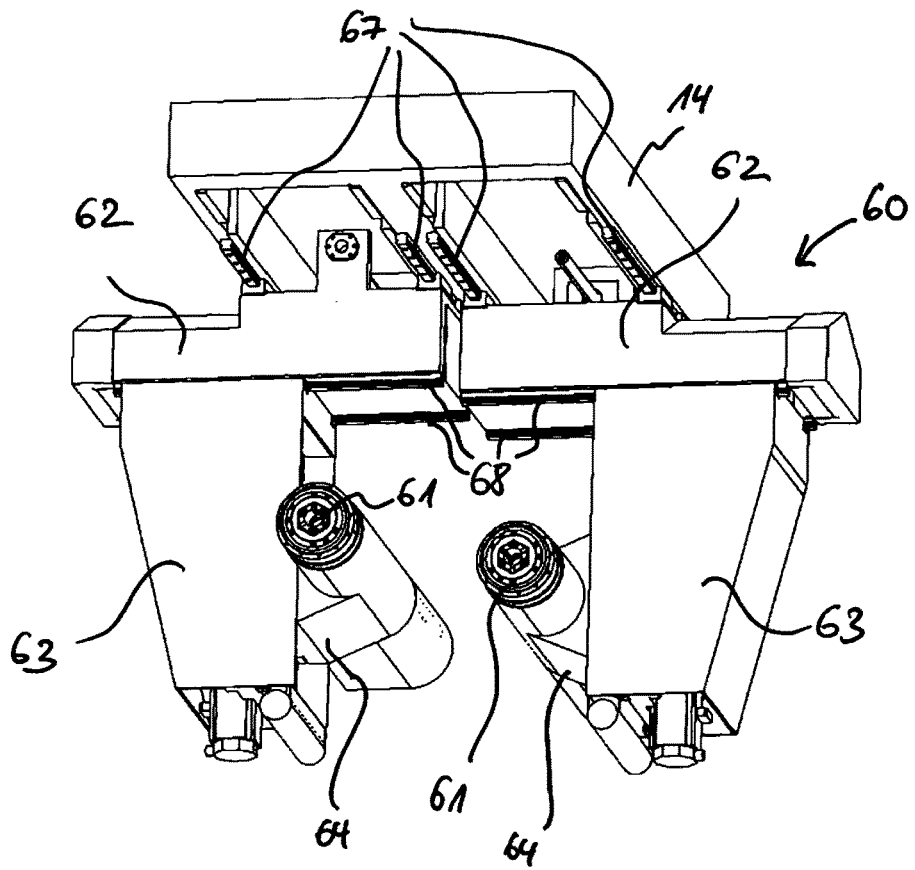

FIGS. 11A and 11B exemplary illustrate schematic perspective views of a counter-spindle assembly of the counter-spindle mechanism 60 of the multi-spindle turning machines according to FIGS. 10A to 10D.

For each counter-spindle 61, the counter-spindle mechanism 60 includes a respective counter-spindle assembly which includes the respective counter-spindle 61 supported by a spindle slide 64 which is slidably supported by a cross slide assembly including a first slide 63 and a second slide 62. The first slide 63 is slidably supported on the second slide 62, and the second slide 62 is slidably supported on the bottom side of the beam portion 14.

By movement of the respective second slide 62 with respect to the beam portion 14 along guides 67, exemplarily arranged on the bottom side of the beam portion 14 so as to extend into a longitudinal direction (Z-direction), by the drive 65 (drive motor), the respective counter-spindle 61 can be moved into the longitudinal direction (Z-direction) which is exemplarily arranged in parallel with respect to the spindle axis of the respective counter-spindle 61 and the spindle axes of the workpiece spindles 30. That is, by such movement in the Z-direction, i.e. towards or away from the opposing workpiece spindles 30, a respective workpiece received at one of the workpiece spindles 30 may be picked up by the respective counter-spindle 61 for rear machining purposes.

Furthermore, by movement of the respective first slide 63 with respect to the second slide 62 along guides 68, exemplarily arranged on the bottom side of the second slide 62 so as to extend into a horizontal direction (X-direction) perpendicular to the longitudinal direction (Z-direction), by another drive (drive motor, not shown), the respective counter-spindle 61 can be moved into the horizontal direction (X-direction) perpendicularly with respect to spindle axis of the respective counter-spindle 61 and the spindle axes of the workpiece spindles 30.

Furthermore, by movement of the respective spindle slide 64 with respect to the first slide 63 along guides (not shown), exemplarily arranged on the first slide 63 so as to extend into a vertical direction (Y-direction) perpendicular to the longitudinal direction (Z-direction), by another drive 66 (drive motor), the respective counter-spindle 61 can be moved into the vertical direction (Y-direction) perpendicularly with respect to spindle axis of the respective counter-spindle 61 and the spindle axes of the workpiece spindles 30.

By the above counter-spindle assemblies of the counter-spindle mechanism 60, each of the counter-spindles can be moved independently in all three directions X, Y and Z, and highly flexible and accurate rear machining operations become possible.

For rear machining processing, a respective counter-spindle 61 (simultaneously with the other counter-spindle or asynchronously with the other counter-spindle) may rotatively drive the picked up workpiece, which has a rear side, which was previously received in the respective workpiece spindle 30, now openly facing the workspace for being machined on said rear side, and said rear side of the workpiece may be machined by way of additional tools (fixed tools or driven tools, i.e. live tools) which may be held by the tool post 71 and 72.

The configuration advantageously allows for a very efficient and compact configuration allowing for additional rear machining of workpieces with optimized chip fall conditions, specifically since the chips may fall downwards to and through the chip opening 11B formed in the machine bed 11 of the machine frame without being obstructed by the counter-spindle mechanism 60 or the tool posts 71 and 72.

Furthermore, the configuration having the beam portion 14 being supported on both sides, respectively by the upper portion of the front frame portion 12 and the outer frame portion 15, has an advantage that a high stability and advantageous stiffness of the machine frame can be achieved.

Figure 12:
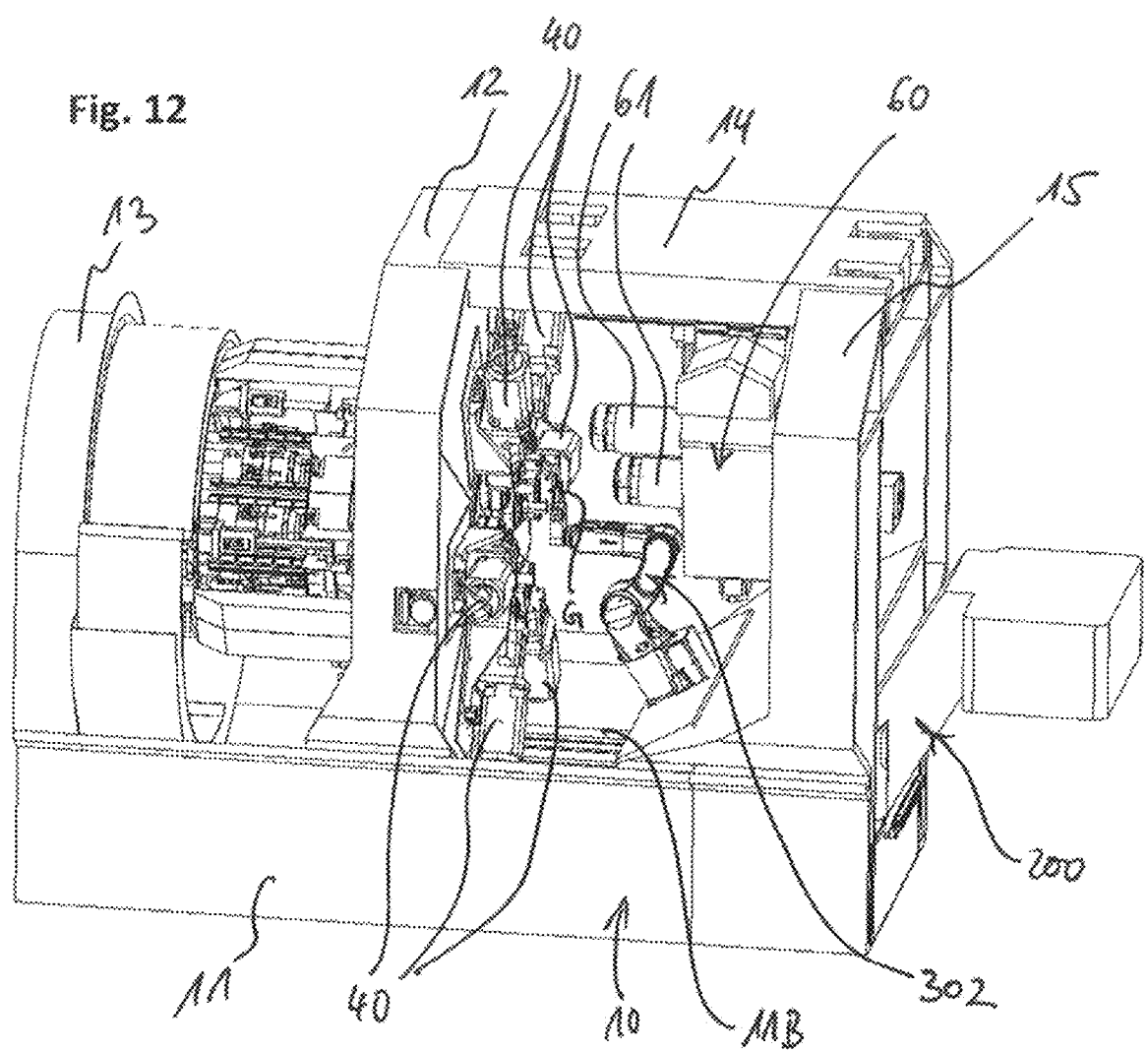
FIG. 12 exemplary illustrates a schematic perspective view of a multi-spindle turning machine according to yet another exemplary embodiment.

FIG. 12 exemplary illustrates a schematic perspective view of a multi-spindle turning machine 100 according to yet another exemplary embodiment, similar to the exemplary embodiments of FIGS. 10A to 10D.

In addition, similar to FIGS. 6A and 6B and 9, the multi-spindle turning machine 100 of FIG. 12 is exemplarily equipped with a robot 302 (exemplarily a six-axis robot). The robot 302 is exemplarily mounted to a portion of the machine bed 11 of the machine frame 10 opposite to the first machine frame upright 12 with respect to the workspace (i.e. a region above the chip fall opening 11B formed in the machine bed 11 of the machine frame 10).

Exemplarily, the robot 302 includes a gripper G adapted to pick up workpieces from the workpiece spindles 30 (e.g. to remove workpieces after completion of the machining process), to pick up workpieces from the counter-spindles 61 and/or adapted to pick up (and/or insert) tool cartridges TC at the tool posts 41 of the tool post assemblies 41, e.g. for automated tool exchanges, and/or even to pick up (and/or insert) tool cartridges TC at the tool posts 71 and 72 hanging from the beam portion 14 (not shown in FIG. 12). The exemplary embodiments are not limited to configurations having one robot but also two or more robots may be provided in yet further exemplary embodiments.

Figure 13A:
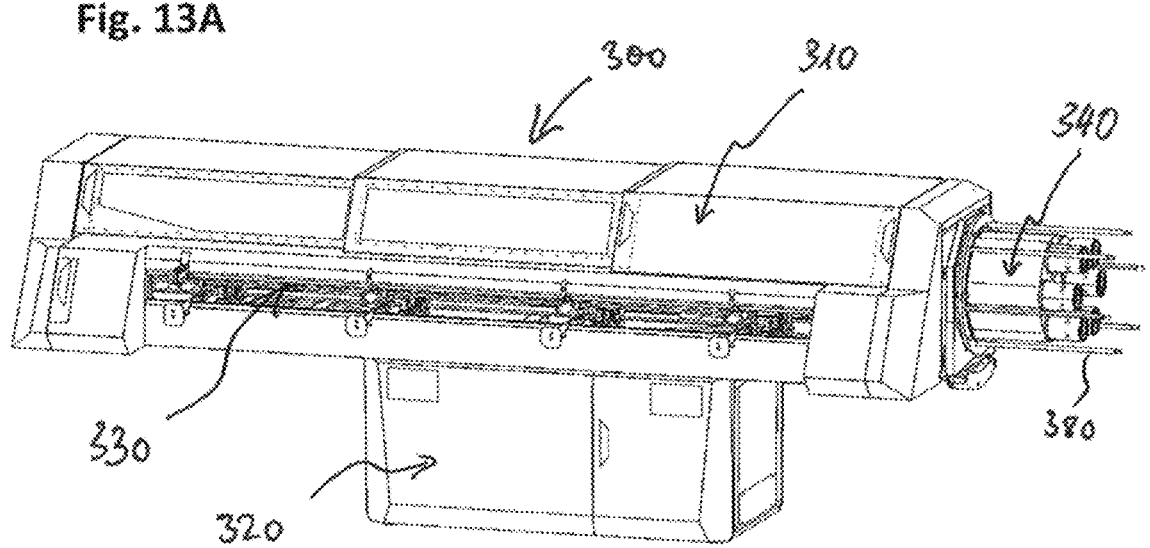
FIGS. 13A to 13C exemplary illustrate schematic perspective views of a bar loader for use at a multi-spindle turning machine and of parts thereof.
Figure 13B:
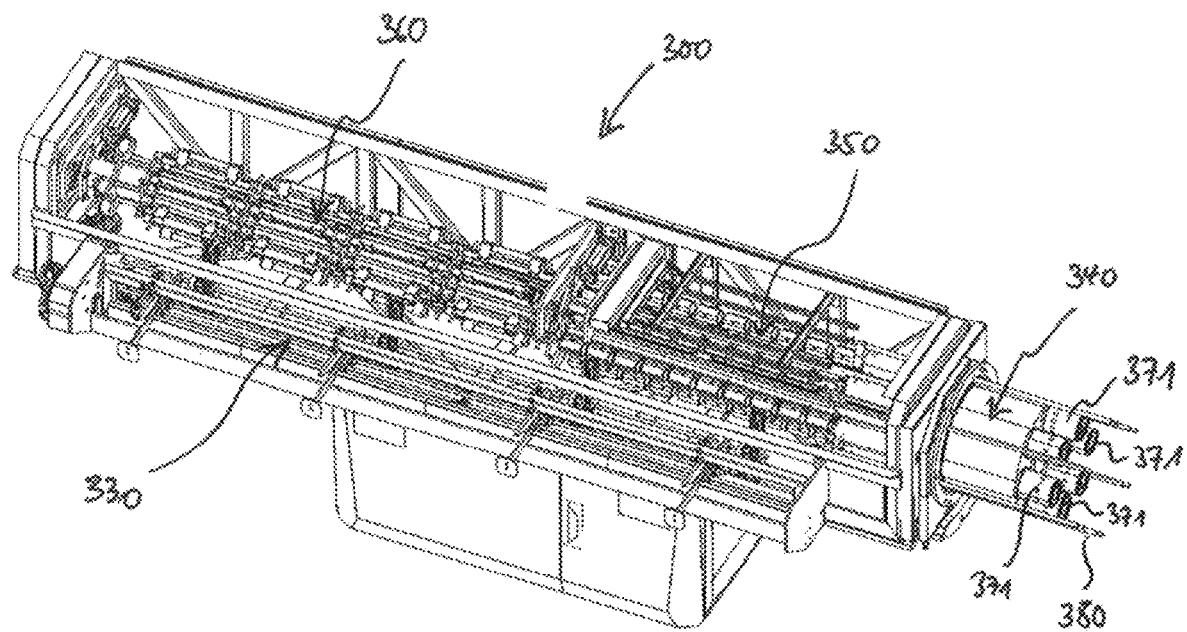
Figure 13C:
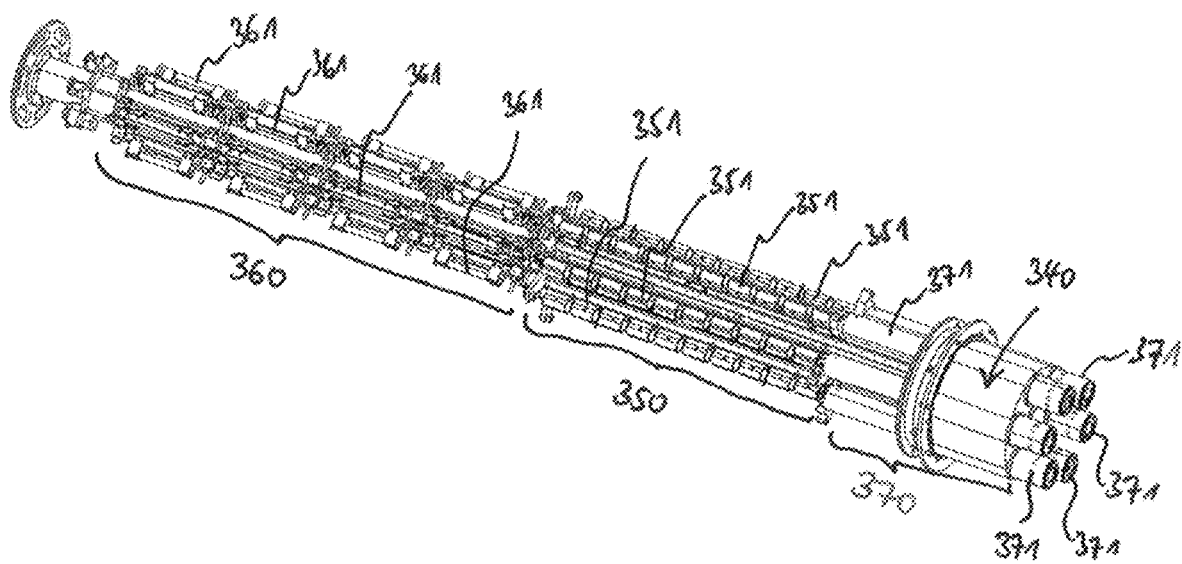

FIGS. 13A to 13C exemplary illustrate schematic perspective views of a bar loader 300 for use at a multi-spindle turning machine 100 and of parts thereof. Such bar loader 300 may exemplarily be used at any of the machine tools of above or below exemplary embodiments.

FIG. 13A exemplary illustrates the bar loader 300 with a housing 310 and a stand 320. Through an opening on a side of the housing 310, the bar loader includes a bar receiving portion 330 for receiving (being supplied) with unprocessed bars or other elongated workpieces to be machined at the multi-spindle turning machine 100. Such elongated workpieces may have round profiles of various widths or other profiles.

On one side of the bar loader 300, a turret fixture body 340 extends laterally from the bar loader 300. The turret fixture body 340 is rotatably supported around a longitudinal axis to be axially arranged with the rotational longitudinal axis of the turret body 20 of the multi-spindle turning machine 100. The turret fixture body 340 is configured to be fixed to the turret body 20 (e.g. by plural fixture rods) from a rear side of the multi-spindle turning machine 100 through a through hole of the back frame portion 13 (see e.g. FIG. 8C) so as to rotate together with the turret body 20 about the axially arranged longitudinal axes thereof.

Specifically, the turret body 20 and the turret fixture body 340 are exemplarily configured to be rigidly fixed to each other to rotate together about the common longitudinal axis. Accordingly, exemplarily the driven rotation of the guide system of the bar loader supported by the turret fixture body 340 is performed by mechanical connection of the turret fixture body 340 with the rear side of the turret body 20 through plural mechanical connections (e.g. by plural fixture rods) working on the external diameter of a rear flange of the machine. This mechanical connection of the turret fixture body 340 with the rear side of the turret body 20 assures the proper angular synchronisms with the spindles in the turret body 20 itself. Accordingly, the rotation of the bar loader guide system and the turret fixture body 340 of the bar loader 300 is exemplarily performed by the torque motor 80 described below.

FIG. 13B exemplarily illustrates the bar loader 300 of FIG. 13A without housing 310 having an inner guide system, which is exemplarily shown in FIG. 13C.

The bar loader guide system as a whole is, together with the turret fixture body 340, rotatably supported about the longitudinal axis of the turret fixture body 340 (longitudinal axis of the guide system), and the guide system includes a fixed guide portion 360, a slidable middle guide portion 350 and a slidable end guide portion 370, wherein each of the fixed guide portion 360, the slidable middle guide portion 350 and the slidable end guide portion 370 are, together, rotatably supported about the longitudinal axis of the turret fixture body 340 (longitudinal axis of the guide system).

Accordingly, when the turret body 20 of the multi-spindle turning machine 100 is rotated/indexed, the turret fixture body 340 of the bar loader 300, being fixed to the turret body 20 of the multi-spindle turning machine 100, rotates in a synchronous manner together with the turret body 20 of the multi-spindle turning machine 100, and the guide system including the fixed guide portion 360, the slidable middle guide portion 350 and the slidable end guide portion 370 is driven to be rotated together with the turret fixture body 340 of the bar loader 300 and the turret body 20 about the common longitudinal axis.

Preferably, the control of the driven rotation of the guide system is thereby performed by driving rotation of the turret 20 by control from the numerical control apparatus (NC) and/or the programmable logic controller (PLC) of the multi-spindle turning machine 100. This has the advantage that the control of the rotation of the turret body 20 and the rotation of the guide system of the bar loader 300 is synchronously controlled.

In addition, preferably, the numerical control system of the multi-spindle turning machine 100 (including the NC and/or the PLC) may be communicably connected with the bar loader's control system according to a master/slave relationship. This has the advantage that the numerical control apparatus (NC) and/or the PLC of the machine is enabled to manage directly plural or all of the functionalities of the bar loader (e.g. the machine is the "master", and the bar loader is the "slave"). Functionalities of the bar loader system may include at least one of: the selection and lifting of a new bar from a bar storage area into the guide system of the bar loader, the introduction of a new bar into a bar loader channel of the guide system, pushing of the bar for feeding new raw material for machining process (e.g. after receiving a specific signal, exemplarily indicating that a spindle collet is opened), and handling of a bar remnant.

The fixed guide portion 360 of the bar loader 300 exemplarily has plural fixed bar guide portions 361 arranged around the longitudinal axis, each fixed bar guide portion 361 being provided for receiving a bar/elongated workpiece for a respective one of the workpiece spindles 30 of the multi-spindle turning machine 100 so that the number of fixed bar guide portions 361 is the same as the number of workpiece spindles 30 of the multi-spindle turning machine 100, at same angular distances corresponding to the angular distances of the workpiece spindles 30 of the multi-spindle turning machine 100 arranged on the turret body 20.

The slidable middle guide portion 350 has plural slidable bar guide portions 351 arranged around the longitudinal axis, each slidable bar guide portion 351 being provided for receiving a bar/elongated workpiece for a respective one of the workpiece spindles 30 of the multi-spindle turning machine 100 so that the number of slidable bar guide portions 351 is the same as the number of workpiece spindles 30 of the multi-spindle turning machine 100, at same angular distances corresponding to the angular distances of the workpiece spindles 30 of the multi-spindle turning machine 100 arranged on the turret body 20.

Each slidable bar guide portion 351 of the slidable middle guide portion 350 is associated with a respective fixed bar guide portion 361 of the fixed guide portion 360, and the respective slidable bar guide portion 351 is axially arranged with its associated fixed bar guide portion 361 in parallel with the longitudinal direction, so that the respective slidable bar guide portion 351 with its associated fixed bar guide portion 361 are configured to simultaneously receive a bar/elongated workpiece supplied through the bar receiving portion 330.

Accordingly, both of the slidable bar guide portion 351 with its associated fixed bar guide portion 361 can be actuated to laterally open for laterally receiving the same bar/elongated workpiece supplied through the bar receiving portion 330, and then to be actuated to be laterally closed for enclosing the bar and providing a longitudinally extending guide channel for the respective received bar.

A feeding mechanism of the fixed guide portion 360 is configured to feed bars/elongated workpieces, received in the slidable bar guide portion 351 with its associated fixed bar guide portion 361, in the longitudinal direction towards the slidable end guide portion 370 and the turret fixture body 340.

The slidable end guide portion 370 has plural slidable bar guide portions 371 arranged around the longitudinal axis, each slidable bar guide portion 371 being provided for receiving a bar/elongated workpiece for a respective one of the workpiece spindles 30 of the multi-spindle turning machine 100 so that the number of slidable bar guide portions 371 is the same as the number of workpiece spindles 30 of the multi-spindle turning machine 100, at same angular distances corresponding to the angular distances of the workpiece spindles 30 of the multi-spindle turning machine 100 arranged on the turret body 20.

Each slidable bar guide portion 371 of the slidable end guide portion 370 is associated with a respective slidable bar guide portion 351 of the slidable middle guide portion 370, and the respective slidable bar guide portion 371 is axially arranged with its associated slidable bar guide portion 351 in parallel with the longitudinal direction, so that the respective slidable bar guide portion 371 with its associated respective slidable bar guide portion 351 are configured to simultaneously guide a bar/elongated workpiece, when the respective bar/elongated workpiece is fed from the fixed guide portion 360 towards the slidable end guide portion 370 and the turret fixture body 340.

In addition, each slidable bar guide portion 371 of the slidable end guide portion 370 longitudinally extends though the turret fixture body 340 of the bar loader 300, being fixed to the turret body 20 of the multi-spindle turning machine 100, so as to extend through the openings 26 of the back end portion 21 of the turret body 20 of the multi-spindle turning machine 100, so that each slidable bar guide portion 371 may be connected or fixed to a respective spindle body 32 of a respective workpiece spindle 30, e.g. by one or more connection elements (e.g. connection rods or the like), preferably one or more per spindle, as exemplarily shown in FIGS. 13A and 13B (connection elements 380).

When the respective bar/elongated workpiece is fed through the respective slidable bar guide portion 371 to extend into the connected spindle body 32 of a respective workpiece spindle 30, another optional feeding mechanism may be provided in the spindle body 32 of a respective workpiece spindle 30, so that the slidable bar guide portions 351 and 371 may be provided without another feeding mechanism, and the slidable bar guide portions 351 and 371 may preferably provide a guide channel providing guiding support for long bars or other elongated workpieces.

Exemplarily, contrary to the fixed bar guide portion 361 of the fixed guide portion 360, each slidable bar guide portion 371 with its respective associated slidable bar guide portion 351 is exemplarily configured to longitudinally slide together with the longitudinal movement of the respective workpiece spindle 30 in the longitudinal Z-direction.

Specifically, since the workpiece spindles 30 are configured to be driven independently from each other in the longitudinal Z-direction, each of the slidable bar guide portions 371 with its respective associated slidable bar guide portion 351 is adapted to longitudinally slide independent of the other slidable bar guide portions 371 with its respective associated slidable bar guide portion 351.

This has the advantage that the bar loader 300 additionally provides a reliable and accurate guiding support for long bars or other elongated workpieces, which gives constant guiding support even when the workpiece spindles 30 are driven in the Z-direction.

Figure 14A:
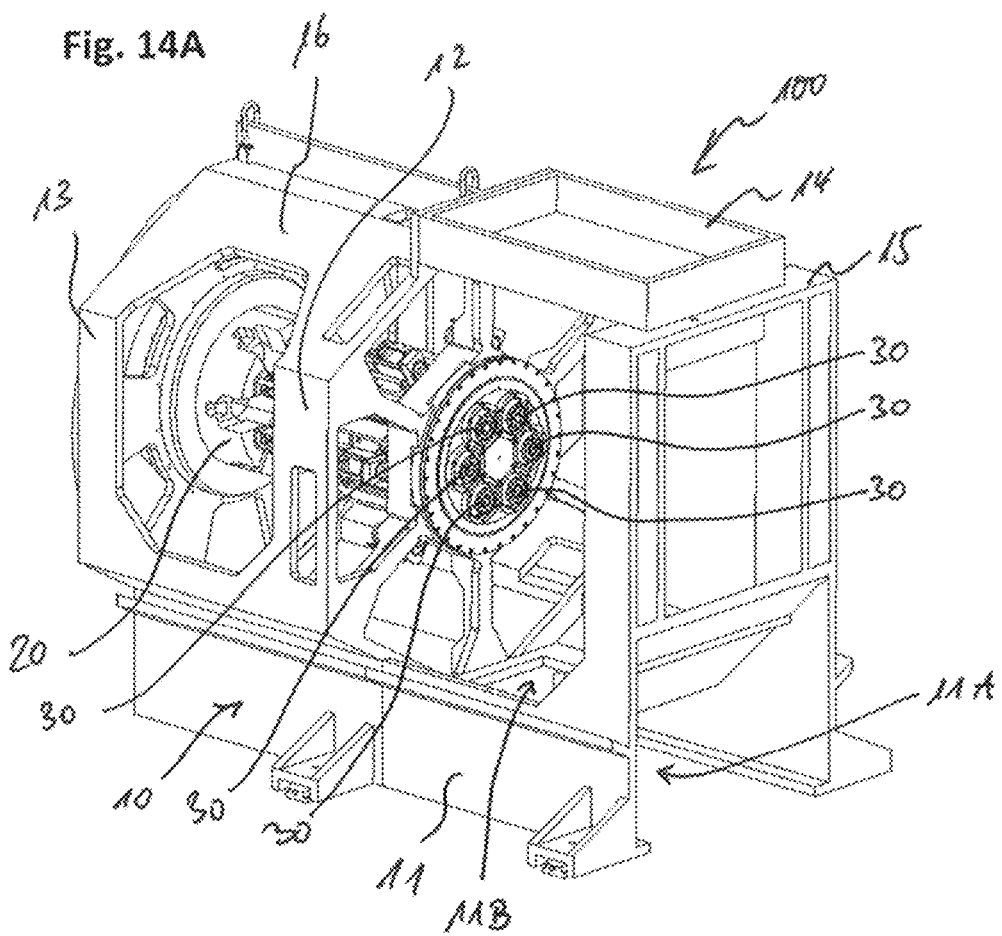
FIGS. 14A and 14B exemplary illustrate schematic perspective views of a machine frame for use at a multi-spindle turning machine according to yet another exemplary embodiment.
Figure 14B:
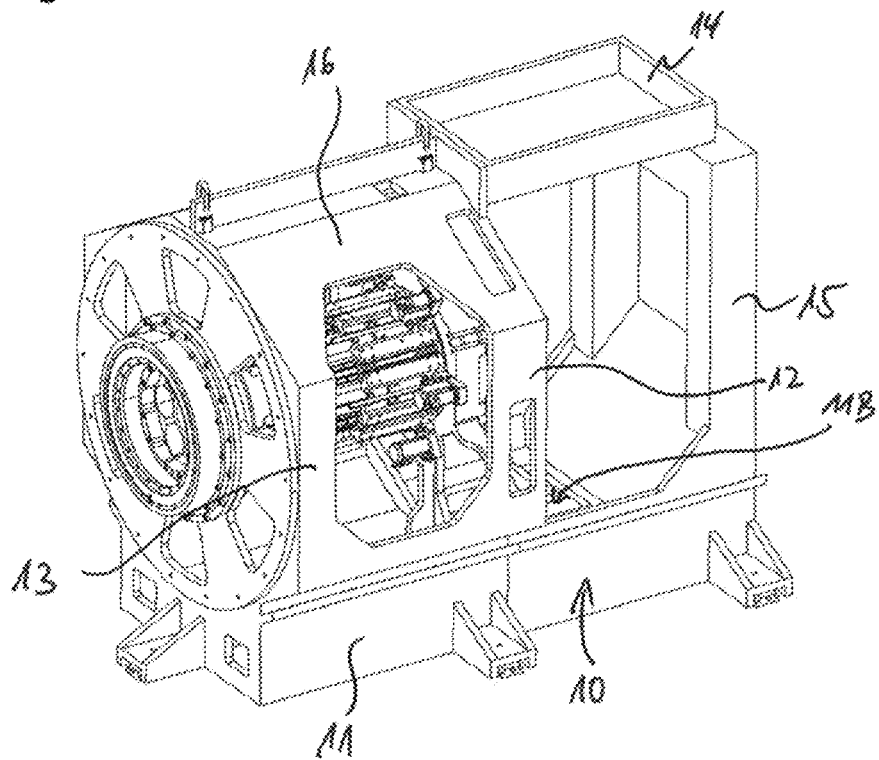

FIGS. 14A and 14B exemplary illustrate schematic perspective views of a machine frame 10 for use at a multi-spindle turning machine 100 according to yet another exemplary embodiment.

Different from the above exemplary embodiments, the machine frame 10 is adapted such that the upper side of the front frame portion 12 and the upper side of the back frame portion 13 are connected by an upper roof frame portion 16 which further increases and improves the stability and stiffness of the machine frame 10, e.g. in addition to the optional beam portion 14 and the frame portion 15 on the other side of the workspace opposite to the front frame portion 12.

In addition, as exemplarily described below for FIGS. 15A and 15B, the configuration of FIGS. 14A and 14B has a modified turret configuration and spindle slide drive mechanism.

Figure 15A:
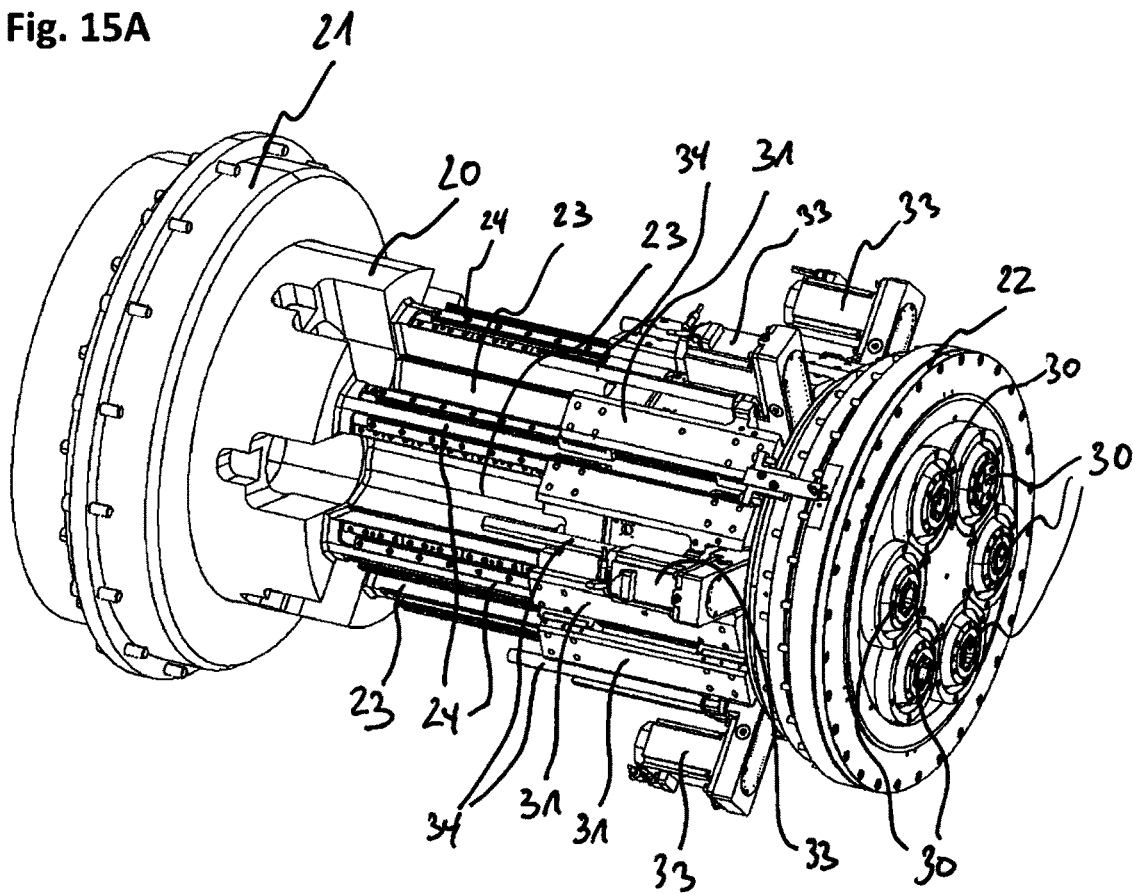
FIGS. 15A and 15B exemplarily illustrate schematic perspective views of a drum of the multi-spindle turning machine frame of FIGS. 14A and 14B.
Figure 15B:
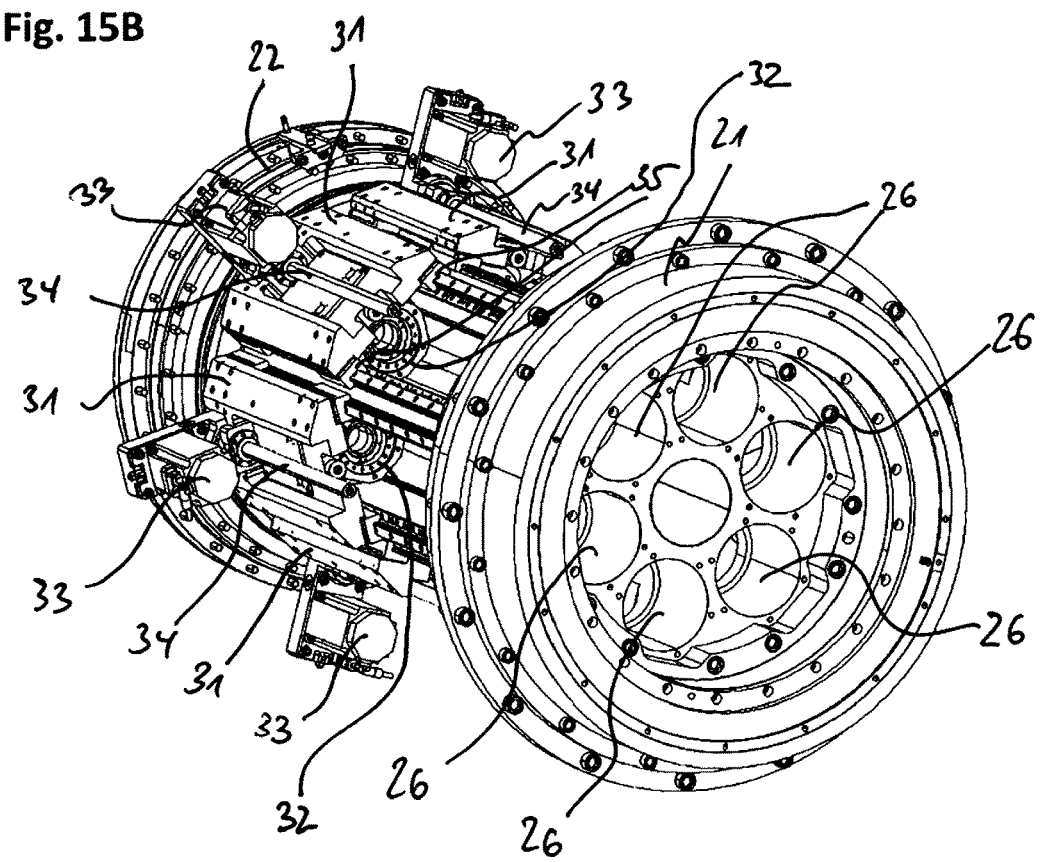

FIGS. 15A and 15B exemplarily illustrate schematic perspective views of a drum/turret body 20 of the multi-spindle turning machine frame 10 of FIGS. 14A and 14B.

The turret body 20 exemplarily has attached a front end portion 22 and a back end portion 21 which are the portions respectively supported rotatably by the front frame portion 12 and the back frame portion 13 of the machine frame 10. The back end portion 21 attached to the turret body 20 includes openings 26 through which each of the spindles 30 may be supplied with workpieces (such as e.g. bars) from a backside of the multi-spindle turning machine 100.

The turret body 20 has, for each of the workpiece spindles 20, a respective longitudinal groove 23 extending longitudinally (Z-direction/longitudinal direction of the turret body 20) from the front end portion 22 to the back end portion 21. The longitudinal grooves 23 are exemplarily opened to the outer circumferential side of the turret body 20 so as to open to the space between the front frame portion 12 and the back frame portion 13 of the machine frame 10.

Exemplarily, the turret body 20 has, between each pair of adjacent grooves 23, a respective ledge portion 24 extending longitudinally (Z-direction/longitudinal direction of the turret body 20) from the front end portion 22 to the back end portion 21. Exemplarily, the number of grooves 23 is the same as the number of longitudinal ledge portions 24.

The spindle bodies 32 of the workpiece spindles 30 are exemplarily guided in the respective longitudinal grooves 23 and supported by the respective spindle slide 31 which is arranged at an outer circumferential side of the turret body 20. Specifically, each spindle slide 31 is exemplarily guided, with guide elements 35, on the longitudinal ledge portions 24 formed on the sides of the respective grooves 23.

Exemplarily, the slide drive mechanism includes a thread shaft 34 driven by a drive 33 (drive motor). In FIGS. 15A and 15B, the drive 33 is not mounted to the spindle slide 31 but is mounted to the front end portion 22 or a front portion of the turret body 20.

When rotatively driving the thread shaft 34 by way of the drive 33, the respective spindle slide 31 is driven in the longitudinal direction (Z-direction, axially with respect to the respective spindle axis) along the guiding ledges 24 so as to move the spindle body 32 of the respective workpiece spindle 30 in the longitudinal Z-direction (e.g. towards or away from the workspace) within the respective longitudinal groove 23.

Figure 16A:
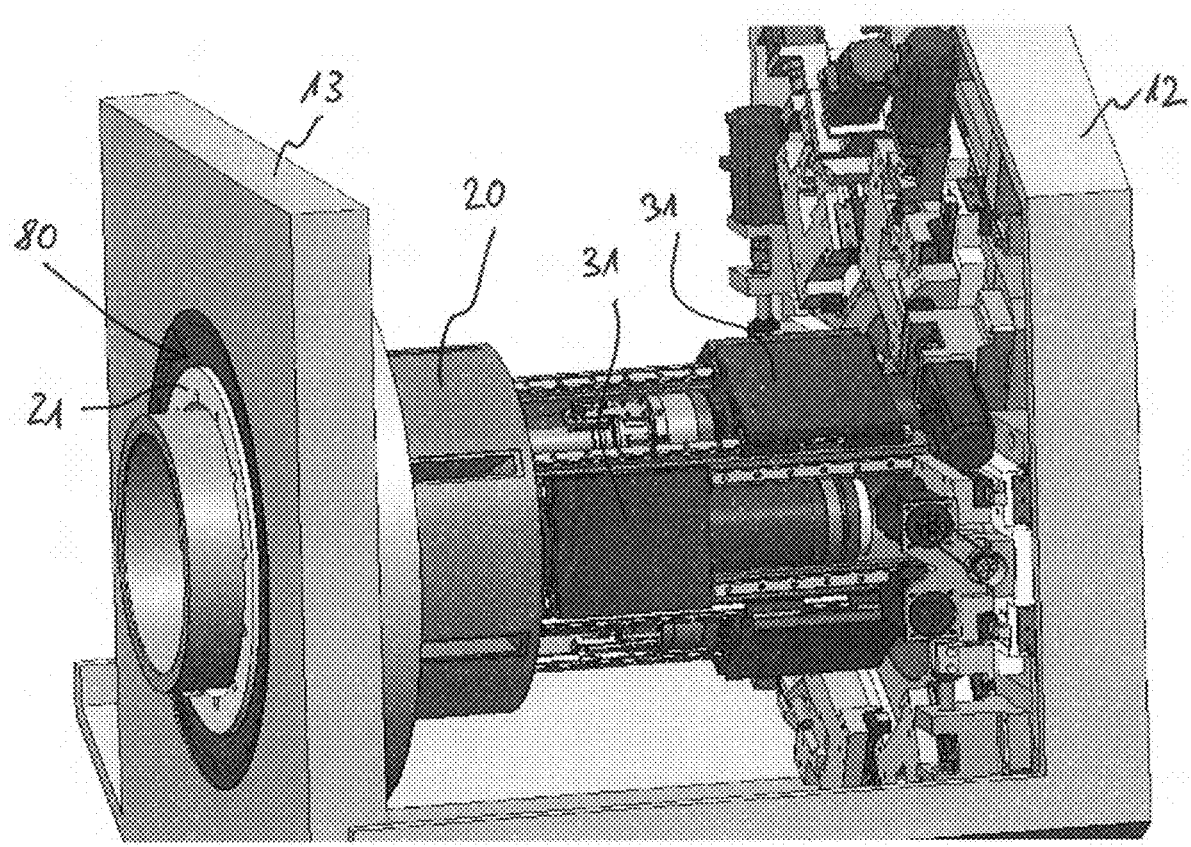
FIGS. 16A to 16C exemplarily illustrate schematic views of a drum of the multi-spindle turning machine frame and detail views thereof for illustrating a drive mechanism thereof.
Figure 16B:
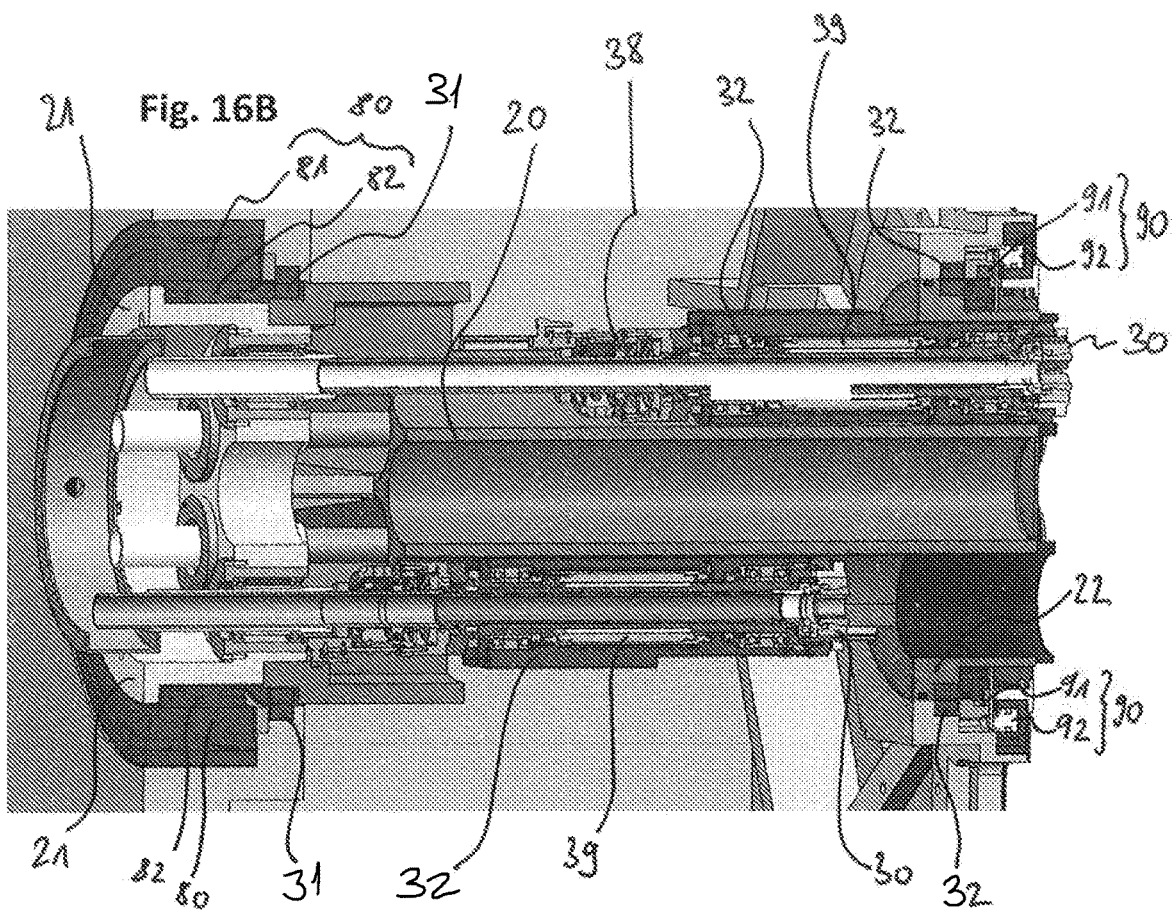
Figure 16C:
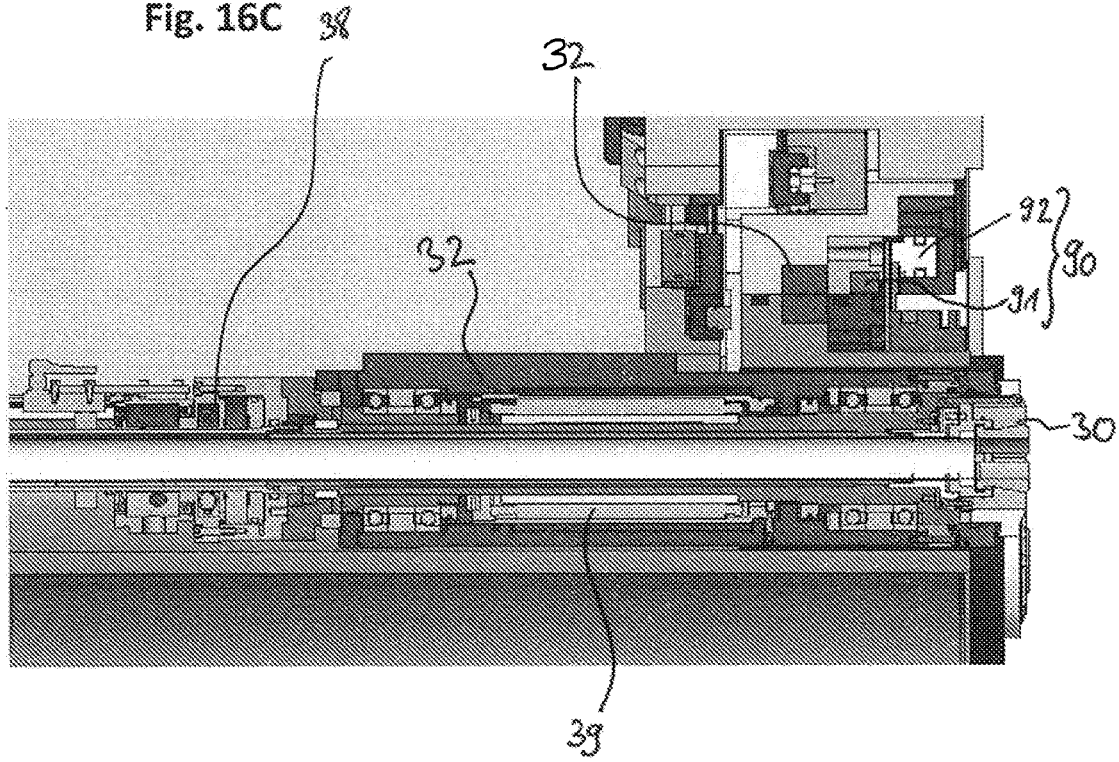

FIGS. 16A to 16C exemplarily illustrate schematic views of a drum (turret body 20) of the multi-spindle turning machine frame 10 and detail views thereof for illustrating a drive mechanism thereof.

As previously described, the turret body 22 is rotatably supported about the longitudinal rotational axis, in that a back-side end portion 21 of the turret body 20 (e.g. made as one piece with the turret body 20 or being attached to the turret body 20 at the back side) is rotatably supported at the back frame portion 13 of the machine frame 10 and a front-side end portion 22 of the turret body 20 (e.g. made as one piece with the turret body 20 or being attached to the turret body 20 at the front side facing the workspace) is rotatably supported at the front frame portion 12 of the machine frame 10.

For driving the rotational movement of the turret body 20, exemplarily a torque motor 80 is provided at the back frame portion 13 of the machine frame 10 (see e.g. FIG. 16A). The use of a torque motor has an advantage that the rotation between machining positions of the workpiece spindles 30 can be controlled efficiently, reliably, accurately and with quick response time by the numerical controller of the machine tool controlling the torque motor 80 as the drive for the rotational movement of the turret body 20.

As exemplarily illustrated in FIGS. 16B and 16C, the torque motor includes a rotor 82 and a stator 81, wherein the rotor 82 is mounted on a circumferential portion of the back-side end portion 21 of the turret body 20, and the stator 81 is mounted to the back frame portion 13 of the machine frame 10. The torque motor 80 is configured to drive the rotational movement of the turret body 20 for movement of the workpiece spindles 30 between machining positions of the workpiece spindles 30.

By including the torque motor 80 into the rotatable support of the end portion of the turret body 20, a compact and efficient, power saving drive mechanism can advantageously be provided.

Furthermore, any potential heat generated potentially by the drive mechanism is advantageously located far and separate from the front frame portion 12 and the front end portion 22, in that the torque motor 80 is separated by the air space between the frame portions 12 and 13 and is located on the opposite end side portion of the turret body 20 with respect to the end side portion 22 of the turret body 20 facing the workspace.

Accordingly, an accuracy and precision of machining operations at the workspace side can be improved since the torque motor 80 as potential heat source, which might affect accuracy by thermal effects, is located on the opposite end side of the turret body 20 so that thermal effects at the side facing the workspace close to the workpiece receiving portions of the workpiece spindles 30 and the tool post assemblies 40 are advantageously minimized, while at the same time having the efficient, accurate and direct driving mechanism provided by the torque motor 80.

To further enhance the accuracy of the machining operations and the movement control of the turret body 20, exemplarily, a positioning system 90 is circumferentially arranged around the front end portion of the turret body 20 facing the workspace at the position of the rotatable support of the front frame portion 12.

The positioning system 90 exemplarily includes a circumferentially arranged absolute encoder 91 for determining the rotational position of the turret body 20.

By detecting a rotational position of the turret body 20 by way of the position signal from the absolute encoder, the driving control of the torque motor 80 can be based on accurate feedback-control to accurately and precisely drive the turret body 20 to the rotational position according to the intended machining position, for aligning the position of the workpiece spindles 30 with the respective tool post assemblies 40.

Since the positioning system is provided at the front side of the turret body 10 at the front frame portion 12 facing directly the workspace and close to the tool post assemblies 40, the accuracy and precision of the positioning system is advantageously improved.

While using an absolute encoder 91 is a very preferred exemplary embodiment, the present invention is not limited to the use of absolute encoders as positioning detecting device, and other positioning detecting devices may be used such as e.g. incremental encoders, e.g. measuring not the absolute position but the distance between the machining positions.

Furthermore, the positioning system 90 exemplarily includes plural brake mechanisms 92 (e.g. hydraulic, pneumatic and/or electric brakes) circumferentially arranged with respect to the front end portion of the turret body 20 facing the workspace at the position of the rotatable support of the front frame portion 12.

Accordingly, when the rotational position of the turret body 20 by way of the position signal from the absolute encoder is detected to be accurately and precisely located at the intended machining position, the brake mechanisms 92 (position locking system) are actuated to fix and lock the rotational position of the turret body 20 in said intended machining position during the machining phase.

In some preferred aspects, a controller may be provided for controlling a machining of one or more workpieces received at the plurality of workpiece spindles 30, when the workpiece spindles 30 are positioned at respective machining positions.

In some preferred aspects, the controller may be further configured to control the torque motor 80 for controlling a rotational movement of the turret body 20 for indexing the workpiece spindles 30 between the respective machining positions and/or to control the position locking mechanism (brake mechanisms 92) for locking the rotational position of the workpiece spindles in the machining positions during the machining of the one or more workpieces.

In some preferred aspects, the controller may be configured to cut a control current of a control signal to the torque motor 80 after a driven rotation of the turret body 20 between the respective machining positions and to actuate the locking position locking mechanism (brake mechanisms 92) before controlling the machining of the one or more workpieces; and/or the controller may be configured to loosen the locked position locking mechanism (brake mechanisms 92) and to activate a control current of a control signal to the torque motor 80 for driving a rotation of the turret body 20 to the next respective machining positions after machining of the one or more workpieces at the current machining positions.

At that time, during the machining phase, when workpieces are machined at the machining positions by the driven rotation of the workpieces spindles 30 and engaging the tools of the tool post assemblies 40, when the rotational position of the turret body 20 is fixed and locked by way of the brake mechanisms 92, the drive signal to the torque motor can be cut off and the torque motor is deenergized.

Accordingly, power can be saved and the heat generation by the torque motor 80 and potential negative thermal effects on accuracy and precision can be reduced even further.

Furthermore, as exemplarily shown in FIGS. 16B and 16C, the turret body 20 is rotatably supported on the front and back frame portions 12 and 13 by way of circumferentially arranged bearings B2 and B1, respectively.

As further shown in FIGS. 16B and 16C, and as previously described, the spindle body 32 of the respective workpiece spindles 30 have an integrated drive 39 (built-in spindle motor) for driving the rotational movement of the respective workpiece spindle 30.

Furthermore, the spindle body 32 of the respective workpiece spindles 30 further includes a clamping unit 38 configured to fixedly clamp a bar or other elongated workpiece received in the respective workpiece spindle 30, wherein the clamping unit 38 exemplarily includes a hydraulic actuator for actuating the clamping and the unclamping of a bar or other elongated workpiece. In other exemplary embodiments, the clamping unit can be actuated by a hydraulic, pneumatic, mechanical, and/or electrical actuator.

Figure 17:
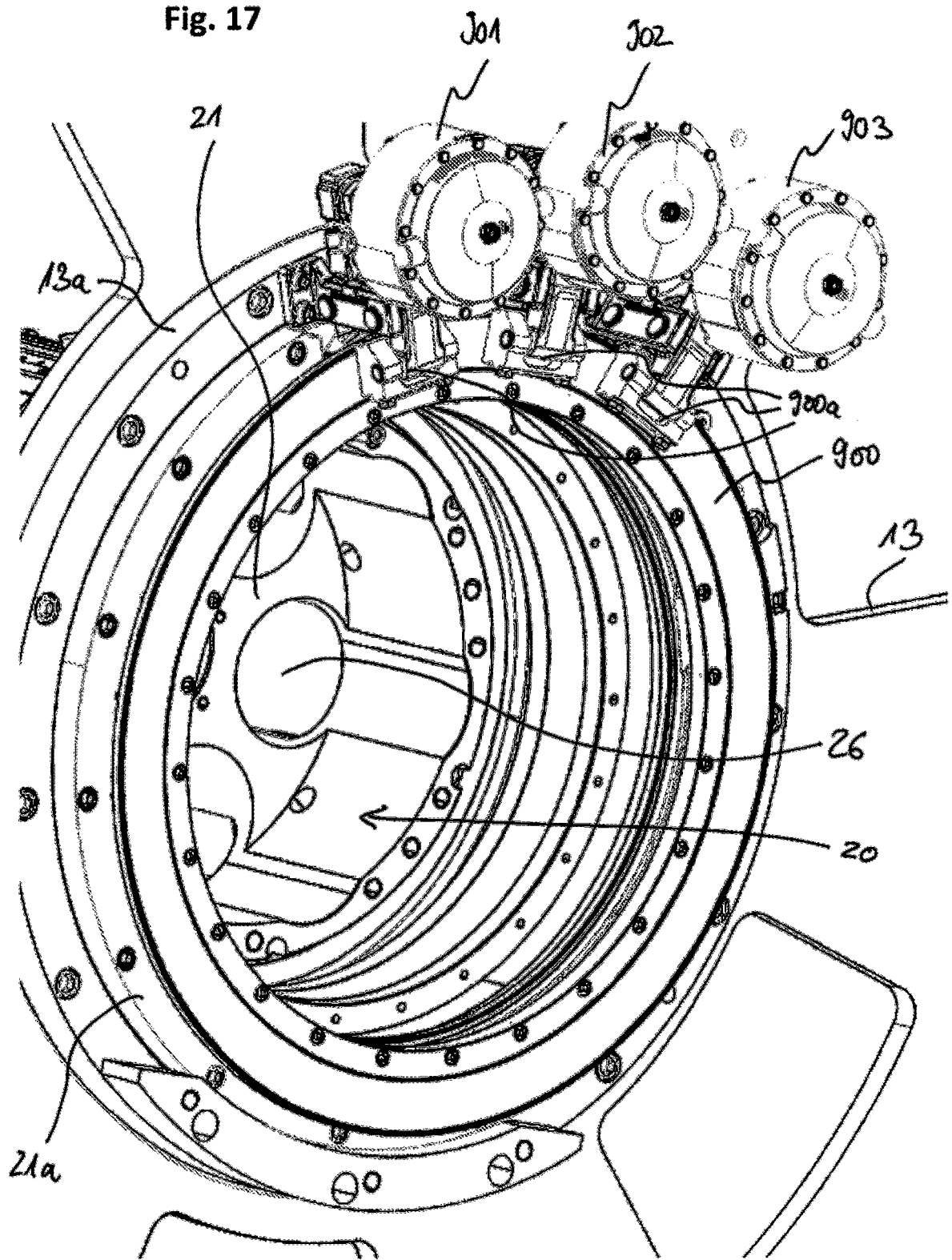
FIG. 17 exemplary illustrates a schematic perspective view of an emergency brake system at a multi-spindle turning machine according to yet another exemplary embodiment.

FIG. 17 exemplary illustrates a schematic perspective view of an emergency brake system at a multi-spindle turning machine according to yet another exemplary embodiment.

It is to be noted that such emergency brake system (safety brake system) may exemplarily be provided at any of the above-mentioned embodiments of multi-spindle turning machines.

FIG. 17 exemplarily shows a back-side of the turret body 20 supported by the back frame portion 13 of the machine frame 10. A rotational support system for rotationally supporting the back-side portion 21 of the turret body 20 includes a fixed support ring structure 13a attached to the back frame portion 13 of the machine frame 10 and rotationally supports a rotatable support ring structure 21a attached to the back-side portion 21 of the turret body 20. The rotational support system may further include the torque motor 80 as described exemplarily above.

Exemplarily, a brake disc 900 is attached to the rotatable support ring structure 21a and exemplarily three electric brakes 901, 902 and 903 are attached to the fixed support ring structure 13a, and each of the electric brakes 901, 902 and 903 includes a respective brake clamp 900a configured to engage with the brake disc 900 being attached to the rotatable support ring structure 21a. The invention is however not limited to three brakes 901, 902 and 903 but may include one or more brakes, and the invention is not limited to electric brakes but may also include hydraulically, electrically and/or pneumatically actuated brakes.

In preferred embodiments, the brake(s) 901, 902 and 903 are configured as normally closed brakes, which are normally biased by a biasing mechanism (e.g. by respective spring mechanisms) into a closing direction to engage with the brake disc 900 such as to fixedly hold the brake disc 900 in the closed state. By electric (and/or pneumatic and/or hydraulic) actuation, the brakes 901, 902 and 903 can be opened to movably release the engagement with the brake disc 900 so as to allow the brake disc 900 and the turret body 20 to rotate about the longitudinal axis (e.g. during machining operations).

Advantageously, if needed e.g. in a failure or collapse or fall down of power supply, the normally closed brakes can again lock engagement with the brake disc 900 by closing the respective brake clamp 900a due to the normally-closing biasing force of the biasing mechanism.

Accordingly, in case of power supply failure or other emergency situation, the safety (emergency) brake system, which is exemplarily provided at the back portion of the turret body 20, may act to initiate an emergency stop of the potentially rotating turret body 20.

By exemplary embodiments as described above, there are proposed beneficial aspects and features to enhance the machining options of the multi-spindle turning machine, to provide a compact machine concept, allowing for more flexible, accurate, efficient and reliable machining operations, and/or to improve accuracy and/or stability of the machine tool.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope of disclosure of the present invention. Those skilled in the art will also appreciate, in view of this disclosure, that different embodiments of the invention described herein may be combined to form other embodiments of the invention. Therefore, it is to be understood that, the invention may be practiced other than as specifically described herein.

The invention claimed is:

1. Machine tool, comprising:
a machine frame,
a turret body being rotatably supported by the machine frame,
a plurality of workpiece spindles being arranged on the turret body, each of the workpiece spindles having a workpiece receiving portion for receiving a respective workpiece on one side of the turret body facing a working space of the machine tool, and
a torque motor for driving a rotation of the turret body, wherein
the torque motor is arranged at a back end portion of the turret body opposite to the side of the turret body facing the working space of the machine tool,
a position locking mechanism for locking a rotational position of the turret body is arranged at a front end portion of the turret body on the side of the turret body facing the working space of the machine tool,
the machine frame includes a back frame portion rotatably supporting the back end portion of the turret body and a front frame portion rotatably supporting the front end portion of the turret body, wherein the turret body is rotatable supported by two bearings, one bearing being arranged on the back frame portion of the machine frame and another bearing being arranged on the front frame portion of the machine frame,
a space is provided between the back frame portion and the front end portion of the machine frame, and
the turret body has, for each workpiece spindle, a longitudinally extending groove portion for receiving the workpiece spindle, the grooves opening to the space provided between the back frame portion and the front end portion, and the turret body supports, for each workpiece spindle, a slide being guided on longitudinal slides extending longitudinally with respect to the turret body and being arranged on an outer side of the turret body adjacent to the respective groove portion.

2. Machine tool according to claim 1, wherein
a position detecting mechanism for determining the rotational position of the turret body is arranged at the front end portion of the turret body on the side of the turret body facing the working space of the machine tool.

3. Machine tool according to claim 2, wherein
the position detecting mechanism is an absolute encoder arranged around the circumference of the front end portion of the turret body.

4. Machine tool according to claim 1, wherein
the position locking mechanism consists of one or more hydraulic, pneumatic, and/or electric brakes.

5. Machine tool according to claim 4, wherein
the position locking mechanism is arranged around the circumference of the front end portion of the turret body.

6. Machine tool according to claim 1, wherein
a stator of the torque motor is supported by the back frame portion of the machine frame, and a rotor of the torque motor is arranged on the back end portion of the turret body.

7. Machine tool according to claim 1, wherein
the position locking mechanism and/or a position detecting mechanism is mounted to the front frame portion of the machine frame.

8. Machine tool according to claim 1, wherein
the turret body supports, for each workpiece spindle, a drive mechanism for driving a longitudinal linear movement of the respective slide of the respective workpiece spindle.

9. Machine tool according to claim 8, wherein
the drive mechanism is arranged on the front end portion of the turret body and/or on the back end portion of the turret body, and/or a housing of the drive mechanism extends radially with respect to the turret body into the space provided between the back frame portion and the front end portion.

10. Machine tool according to claim 1, wherein
a safety brake system is arranged on the back frame portion of the machine frame, the safety brake system including one or more electrically, pneumatically and/or hydraulically actuated brakes configured to brake a rotational movement of the turret body, wherein the safety brake system includes one or more normally closed brakes being biased into a closing state by a biasing mechanism.

11. Machine tool according to claim 1, comprising
a controller for controlling a machining of one or more workpieces received at the plurality of workpiece spindles, when the workpiece spindles are positioned at respective machining positions, the controller being further configured to control the torque motor for controlling a rotational movement of the turret body for indexing the workpiece spindles between the respective machining positions and to control the position locking mechanism for locking the rotational position of the workpiece spindles in the machining positions during the machining of the one or more workpieces.

12. Machine tool according to claim 11, wherein the controller is configured to cut a control current of a control signal to the torque motor after a driven rotation of the turret body between the respective machining positions and to actuate the position locking mechanism before controlling the machining of the one or more workpieces; and/or the controller is configured to loosen the position locking mechanism from a locked position and to activate the control current of the control signal to the torque motor for driving a rotation of the turret body to the next respective machining positions after machining of the one or more workpieces at a current machining position.

13. Machine tool according to claim 1, wherein the machine tool is a multi-spindle turning machine.

\* \* \* \* \*